US007491773B2

(12) United States Patent
Shaffer et al.

(10) Patent No.: US 7,491,773 B2
(45) Date of Patent: *Feb. 17, 2009

(54) HALOGENATED POLYMERS WITH NEW SEQUENCE DISTRIBUTIONS

(75) Inventors: Timothy Daniel Shaffer, Hackettstown, NJ (US); David Yen-Lung Chung, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,660

(22) Filed: Dec. 10, 2004

(65) Prior Publication Data

US 2005/0101751 A1 May 12, 2005

Related U.S. Application Data

(63) Continuation of application No. PCT/US2003/040916, filed on Dec. 19, 2003.

(60) Provisional application No. 60/479,081, filed on Jun. 17, 2003, provisional application No. 60/464,187, filed on Apr. 21, 2003, provisional application No. 60/435,061, filed on Dec. 20, 2002.

(51) Int. Cl.
| | |
|---|---|
| C08F 36/02 | (2006.01) |
| C08F 36/06 | (2006.01) |
| C08F 36/08 | (2006.01) |
| C08F 36/16 | (2006.01) |
| C08C 19/12 | (2006.01) |
| C08C 19/14 | (2006.01) |
| C08C 19/16 | (2006.01) |
| C08C 19/18 | (2006.01) |

(52) U.S. Cl. ............ 525/332.3; 525/192; 525/232; 525/332.8; 525/333.1; 525/355

(58) Field of Classification Search ........... 525/192, 525/232, 332.3, 332.8, 333.1, 355
See application file for complete search history.

(56) References Cited

U.S. PATENT DOCUMENTS

| | | | |
|---|---|---|---|
| 2,474,571 A | 6/1949 | Brakeley et al. | 260/85.3 |
| 2,494,585 A | 1/1950 | Saylor, Jr. | 260/85.3 |
| 2,534,698 A | 12/1950 | Calfee et al. | 260/85.3 |
| 2,548,415 A | 4/1951 | Welch et al. | 260/85.3 |
| 2,603,626 A | 7/1952 | Kolfenbach et al. | 260/85.3 |
| 2,607,764 A | 8/1952 | Nelson et al. | 260/85.3 |
| 2,644,809 A | 7/1953 | Saylor, Jr. | 260/85.3 |
| 3,269,972 A | 8/1966 | Banks et al. | 260/32.2 |
| 3,331,822 A | 7/1967 | Kometani et al. | 260/87.5 |
| 3,397,166 A | 8/1968 | Schmidle et al. | 260/33.6 |
| 3,440,219 A | 4/1969 | Wolff et al. | 260/63 |
| 3,470,143 A | 9/1969 | Schrage et al. | 260/82.5 |
| 3,493,530 A | 2/1970 | Sianesi et al. | 260/33.2 |
| 3,528,954 A | 9/1970 | Carlson | 260/87.5 |
| 3,590,025 A | 6/1971 | Tittle | 260/92.1 |
| 3,616,371 A | 10/1971 | Ukihashi et al. | 204/159.22 |
| 3,642,742 A | 2/1972 | Carlson | 260/87.5 A |
| 3,787,379 A | 1/1974 | Ferren et al. | 260/87.5 A |
| 3,919,183 A | 11/1975 | Jager et al. | 260/86.1 R |
| 3,996,281 A | 12/1976 | Huber-Emden et al. | 260/561 N |
| 4,042,634 A | 8/1977 | Cope et al. | 210/616 |
| 4,100,225 A | 7/1978 | Mueller | 260/878 R |
| 4,107,417 A * | 8/1978 | Priola et al. | 526/117 |
| 4,123,602 A | 10/1978 | Ukihashi et al. | 526/206 |
| 4,166,165 A | 8/1979 | Hisasue et al. | 526/87 |
| 4,194,073 A | 3/1980 | McDaniel | 526/98 |
| 4,248,988 A | 2/1981 | Halasa | 526/141 |
| 4,255,546 A | 3/1981 | Süling et al. | 526/206 |
| 4,338,237 A | 7/1982 | Sulzbach et al. | 524/777 |
| 4,381,387 A | 4/1983 | Sulzbach | 526/247 |
| 4,424,324 A | 1/1984 | Throckmorton et al. | 526/220 |
| 4,435,553 A | 3/1984 | Throckmorton et al. | 526/201 |
| 4,452,960 A | 6/1984 | Throckmorton | 526/201 |
| 4,499,249 A | 2/1985 | Nakagawa et al. | 526/206 |
| 4,501,865 A | 2/1985 | König et al. | 526/71 |
| 4,508,881 A | 4/1985 | Throckmorton | 526/201 |
| 4,535,136 A | 8/1985 | Wheland | 526/214 |
| 4,588,796 A | 5/1986 | Wheland | 526/214 |
| 4,626,608 A | 12/1986 | Scherer, Jr. et al. | 570/134 |
| 4,714,747 A | 12/1987 | Bruzzone et al. | 526/64 |

(Continued)

FOREIGN PATENT DOCUMENTS

EP 0271243 6/1988

(Continued)

OTHER PUBLICATIONS

Corno, et al., Cationic Copolymers of Isobutylene. 2. Nuclear Magnetic Resonance Investigation of the Structure of Isobutylene-Isoprene Copolymers Macromolecules, 13, p. 1092-1099 (1980).
White, et al., Incorporation of Isoprene in Isobutylene/Isoprene Copolymers: NMR Identification of Branching in Butyl Rubber, Macromolecules, 28 p. 3290-330, (1995).
Bovey, et al., Chain Structure and Conformation of Macromolecules, Academic Press, NY p. 127 (1982).
U.S. Appl. No. 11/010,092, filed Dec. 10, 2004, entitled "Polymers with New Sequence Distributions" (2003B133C/2).
Industrial and Engineering Chemistry, Jan. 1949, 41, pp. 135-136, "Emulsion Polymerizations at Low Temperatures. Isobutylene and Isobutylene-Butadiene Mixtures", G. B. Bachman et al., Purdue University.

(Continued)

Primary Examiner—Roberto Rábago
(74) Attorney, Agent, or Firm—Nancy Krawczyk; Xiaobing Feng; Catherine Bell

(57) ABSTRACT

The invention relates to new polymerization processes including diluents including hydrofluorocarbons and their use to produce novel halogenated polymers with new sequence distributions. In particular, the invention relates to halogenated copolymers of an isoolefin, preferably isobutylene, and a multiolefin, preferably a conjugated diene, more preferably isoprene, with new sequence distributions.

87 Claims, 4 Drawing Sheets

U.S. PATENT DOCUMENTS

| | | | |
|---|---|---|---|
| 4,736,004 A | 4/1988 | Scherer, Jr. et al. | 526/206 |
| 4,900,777 A | 2/1990 | Ball et al. | 524/819 |
| 4,946,936 A | 8/1990 | Moggi et al. | 528/392 |
| 4,948,844 A | 8/1990 | Nakahara et al. | 525/356 |
| 4,950,724 A | 8/1990 | Malanga et al. | 526/144 |
| 5,032,656 A | 7/1991 | Mares et al. | 526/255 |
| 5,105,047 A | 4/1992 | Waller | 585/515 |
| 5,135,998 A | 8/1992 | Mares et al. | 526/206 |
| 5,162,445 A | 11/1992 | Powers et al. | 525/333.4 |
| 5,182,342 A | 1/1993 | Feiring et al. | 526/206 |
| 5,281,680 A | 1/1994 | Grot | 526/243 |
| 5,310,870 A | 5/1994 | Peavy | 528/392 |
| 5,417,930 A | 5/1995 | McDonald, Jr. et al. | 422/131 |
| 5,448,001 A | 9/1995 | Baird | 526/134 |
| 5,459,212 A | 10/1995 | Krespan et al. | 526/89 |
| 5,478,905 A | 12/1995 | Anolick et al. | 526/254 |
| 5,494,984 A | 2/1996 | Funaki et al. | 526/206 |
| 5,527,870 A | 6/1996 | Maeda et al. | 526/348.7 |
| 5,552,500 A | 9/1996 | Peavy | 526/206 |
| 5,608,002 A | 3/1997 | Kubo et al. | 524/795 |
| 5,618,894 A | 4/1997 | DeSimone et al. | 526/89 |
| 5,624,878 A | 4/1997 | Devore et al. | 502/152 |
| 5,637,663 A | 6/1997 | Anolick et al. | 526/254 |
| 5,650,483 A | 7/1997 | Malik et al. | 528/402 |
| 5,654,450 A | 8/1997 | Malik et al. | 549/511 |
| 5,663,251 A | 9/1997 | Kato et al. | 526/206 |
| 5,663,255 A | 9/1997 | Anolick et al. | 526/254 |
| 5,665,838 A | 9/1997 | Peavy | 526/255 |
| 5,668,250 A | 9/1997 | Malik | 528/402 |
| 5,668,251 A | 9/1997 | Malik et al. | 528/402 |
| 5,674,957 A | 10/1997 | DeSimone et al. | 526/89 |
| 5,688,838 A | 11/1997 | Abusleme et al. | 522/33 |
| 5,703,194 A | 12/1997 | Malik et al. | 528/70 |
| 5,728,783 A | 3/1998 | Falchi et al. | 526/124.2 |
| 5,780,565 A | 7/1998 | Clough et al. | 526/206 |
| 5,789,504 A | 8/1998 | Ihara et al. | 526/206 |
| 5,807,977 A | 9/1998 | Malik et al. | 528/402 |
| 5,821,311 A | 10/1998 | Mosbach et al. | 526/201 |
| 5,872,198 A | 2/1999 | Mosbach et al. | 526/221 |
| 5,883,198 A * | 3/1999 | Kaszas et al. | 525/356 |
| 5,939,501 A | 8/1999 | DeSimone et al. | 526/89 |
| 5,939,502 A | 8/1999 | DeSimone et al. | 526/89 |
| 5,959,050 A | 9/1999 | Mosbach et al. | 526/201 |
| 5,981,673 A | 11/1999 | DeSimone et al. | 526/89 |
| 5,990,251 A | 11/1999 | Gelus | 526/125.7 |
| 6,037,483 A | 3/2000 | Malik et al. | 549/511 |
| 6,107,423 A | 8/2000 | Wheland et al. | 526/249 |
| 6,111,062 A | 8/2000 | Shirota et al. | 528/402 |
| 6,133,389 A | 10/2000 | Anolick et al. | 526/206 |
| 6,225,367 B1 | 5/2001 | Chaouk et al. | 521/149 |
| 6,228,963 B1 | 5/2001 | Wheland et al. | 526/247 |
| 6,303,715 B1 | 10/2001 | Kim et al. | 526/128 |
| 6,306,989 B1 | 10/2001 | Bloom et al. | 526/200 |
| 6,335,408 B1 | 1/2002 | Russo et al. | 526/253 |
| 6,337,373 B1 | 1/2002 | Formaro et al. | 525/193 |
| 6,346,587 B1 | 2/2002 | Krüger et al. | 526/206 |
| 6,372,838 B1 | 4/2002 | Rao et al. | 524/462 |
| 6,380,351 B1 | 4/2002 | Malik et al. | 528/402 |
| 6,399,729 B1 | 6/2002 | Farnham et al. | 526/255 |
| 6,403,539 B1 | 6/2002 | Marchionni et al. | 508/406 |
| 6,417,314 B1 | 7/2002 | Malik et al. | 528/60 |
| 6,423,798 B2 | 7/2002 | Wheland et al. | 526/206 |
| 6,444,768 B1 | 9/2002 | Webb et al. | 526/237 |
| 6,448,368 B1 | 9/2002 | Malik et al. | 528/402 |
| 6,455,650 B1 | 9/2002 | Lipian et al. | 526/171 |
| 6,469,116 B2 | 10/2002 | Maccone et al. | 526/247 |
| 6,469,185 B1 | 10/2002 | Russo et al. | 549/455 |
| 6,486,280 B1 | 11/2002 | Anolick et al. | 526/243 |
| 2001/0012880 A1 | 8/2001 | Wheland et al. | 526/249 |
| 2001/0018144 A1 | 8/2001 | Watakabe et al. | 429/33 |
| 2002/0002219 A1 | 1/2002 | Bloom et al. | 524/11 |
| 2002/0028884 A1 | 3/2002 | Formaro et al. | 525/193 |
| 2002/0032291 A1 | 3/2002 | Farnham et al. | 526/227 |
| 2002/0052454 A1 | 5/2002 | Lipian et al. | 526/171 |
| 2002/0055580 A1 | 5/2002 | Lorah et al. | 524/445 |
| 2002/0055581 A1 | 5/2002 | Lorah et al. | 524/445 |
| 2002/0055599 A1 | 5/2002 | Slone | 526/286 |
| 2002/0065383 A1 | 5/2002 | Maccone et al. | 526/247 |
| 2002/0086908 A1 | 7/2002 | Chou et al. | 516/98 |
| 2002/0132910 A1 | 9/2002 | Rao et al. | 524/544 |
| 2002/0151664 A1 | 10/2002 | Farnham et al. | 526/247 |
| 2002/0183457 A1 | 12/2002 | Hintzer et al. | 525/326.2 |
| 2002/0183471 A1 | 12/2002 | Russo et al. | 526/247 |
| 2003/0023013 A1 | 1/2003 | Lipian et al. | 526/171 |
| 2005/0107536 A1 | 5/2005 | Shaffer et al. | |
| 2006/0079655 A1 | 4/2006 | Chung et al. | |
| 2006/0084770 A1 | 4/2006 | Milner et al. | |
| 2006/0089467 A1 | 4/2006 | McDonald et al. | |
| 2006/0094847 A1 | 5/2006 | Milner et al. | |
| 2006/0100398 A1 | 5/2006 | Shaffer et al. | |
| 2006/0100409 A1 | 5/2006 | Shaffer et al. | |
| 2006/0111522 A1 | 5/2006 | McDonald et al. | |
| 2008/0015307 A1* | 1/2008 | Waddell et al. | 524/578 |

FOREIGN PATENT DOCUMENTS

| | | |
|---|---|---|
| EP | 713853 | 5/1996 |
| EP | 713883 | 5/1996 |
| WO | WO93/21241 | 10/1993 |
| WO | WO94/17109 | 8/1994 |
| WO | WO96/24625 | 8/1996 |
| WO | WO99/50209 | 10/1999 |
| WO | WO00/04061 | 1/2000 |
| WO | WO00/47641 | 8/2000 |
| WO | WO00/53682 | 9/2000 |
| WO | WO01/49757 | 7/2001 |
| WO | WO01/49758 | 7/2001 |
| WO | WO01/49760 | 7/2001 |
| WO | WO02/34794 | 5/2002 |
| WO | WO02/051875 | 7/2002 |
| WO | WO02/096964 | 12/2002 |
| WO | WO2004058825 | 7/2004 |
| WO | WO2004058827 | 7/2004 |
| WO | WO2004058828 | 7/2004 |
| WO | WO2004058829 | 7/2004 |
| WO | WO2004058835 | 7/2004 |
| WO | WO2004058836 | 7/2004 |
| WO | WO2004067577 | 7/2004 |

OTHER PUBLICATIONS

W. A. Thaler et al., entitled "High-Molecular-Weight, High-Unsaturation Copolymers of Isobutylene and Conjugated Dienes", 49(4) Rubber Chemistry & Technology, 960-966 (1976).

Organic Chemistry, Sixth Edition, Morrison and Boyd, Prentice-Hall, entitled "Ionic Polymerization. Living Polymers", pp. 1084-1085 (Englewood Cliffs, New Jersey 1992).

H. C. Wang et al., Elastomerics, entitled "Functionalized PMS/IB Copolymers Offer Wide Range of Properties", 1992, Atlanta, GA.

Gyor et al., J. Macromol. Sci.-Pure Appl. Chem. A31(12), entitled Polyisobutylene-Based Thermoplastic Elastomers. I. Synthesis and Characterization of Polystyrene-Polyisobutylene-Polystyrene Triblock Copolymers, pp. 2055-2065, Massachusetts, 1994.

I. Orszagh et al., J. Phys. Org. Chem., vol. 8, entitled "Living Carbocationic Copolymerizations. I. Synthesis and Characterization of Isobutylene/p-Methystyrene Copolymers", Ohio, pp. 258-272, 1995.

Chemical Microstructure of Polymer Chains, J.L. Koenig, Wiley-Interscience, entitled "Determination of Structure-Property Relations in Polymers", New York, 1980, pp. 1-8.

Polymer Sequence Determination: Carbon-13 NMR Method, entitled "A Survey of Carbon-13 NMR Studies of Vinyl Homopolymers and Copolymers" J.C. Randall, Academic Press, 1977, New York, pp. 103-146.

Cationic Polymerization of Olefins: A Critical Inventory, J. P. Kennedy, Wiley-Interscience, New York, 1975 pp. 10-13 "Cationic Polymerizations: Past, Present, and Future" and pp. 86-137 "The Organization of Cationically Polymerizable Olefins".

Carbocationic Polymerization, J.P. Kennedy, E. Marechal, Wiley-Interscience, New York, 1982, pp. 318-319.

Abstract for DE10061727, Jun. 13, 2002 entitled "Manufacture of Polyisobutenes with High Content of Unsaturated End Groups", 2 pages.

Abstract for EP76511, Apr. 13, 1983, entitled "Aqueous Copolymer Dispersions and Their Use", 3 pages.

Derwent—Abstract for RU 2097122 C1, Dobrovinskii et al., Nov. 27, 1997, 3 pages.

Abstract for RU2209213, Jul. 27, 2003, entitled "Production of Butyl Rubber with Separation of Reaction Mixture in a Hydrocyclone and In-Process Recycling", Dobrovinskii et al., 2 pgs.

Derwent Abstract for SU 1627243 A, Khismatull et al., Feb. 15, 1991.

* cited by examiner

HALOGENATED POLYMERS WITH NEW SEQUENCE DISTRIBUTIONS

CROSS REFERENCE TO RELATED APPLICATIONS

This application is continuation of International Application No. PCT/US2003/040916, filed Dec. 19, 2003 that claims the benefit of Provisional Application Nos. 60/435,061, filed Dec. 20, 2002, No. 60/464,187, filed Apr. 21, 2003, and 60/479,081, filed Jun. 17, 2003, the disclosures of which are incorporated by reference.

FIELD OF INVENTION

The invention relates to new polymerization processes including diluents including hydrofluorocarbons and their use to produce novel polymers with new sequence distributions. In particular, the invention relates to copolymers of an isoolefin, preferably isobutylene, and a multiolefin, preferably a conjugated diene, more preferably isoprene, with new sequence distributions.

BACKGROUND

Isoolefin polymers are prepared in carbocationic polymerization processes. Of special importance is butyl rubber which is a copolymer of isobutylene with a small amount of isoprene. Butyl rubber is made by low temperature cationic polymerization that generally requires that the isobutylene have a purity of >99.5 wt % and the isoprene have a purity of >98.0 wt % to prepare high molecular weight butyl rubber.

The carbocationic polymerization of isobutylene and its copolymerization with comonomers like isoprene is mechanistically complex. See, e.g., *Organic Chemistry*, SIXTH EDITION, Morrison and Boyd, Prentice-Hall, 1084-1085, Englewood Cliffs, N.J. 1992, and K. Matyjaszewski, ed, *Cationic Polymerizations*, Marcel Dekker, Inc., New York, 1996. The catalyst system is typically composed of two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation. Of these, the diluent is typically considered important.

Industry has generally accepted widespread use of a slurry polymerization process (to produce butyl rubber, polyisobutylene, etc.) in the diluent methyl chloride. Typically, the polymerization process extensively uses methyl chloride at low temperatures, generally lower than −90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers. Likewise polymerizations of isobutylene and para-methylstyrene are also conducted using methyl chloride. Similarly, star-branched butyl rubber is also produced using methyl chloride.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

The commercial reactors typically used to make these rubbers are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CFSTR") is found in U.S. Pat. No. 5,417,930, incorporated by reference, hereinafter referred to in general as a "reactor" or "butyl reactor". In these reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, inhibiting heat transfer, which would tend to cause the slurry temperature to rise. This often limits the practical slurry concentration that can be used in most reactors from 26 to 37 volume % relative to the total volume of the slurry, diluent, and unreacted monomers. The subject of polymer accumulation has been addressed in several patents (such as U.S. Pat. Nos. 2,534,698, 2,548,415, 2,644,809). However, these patents have unsatisfactorily addressed the myriad of problems associated with polymer particle agglomeration for implementing a desired commercial process.

U.S. Pat. No. 2,534,698 discloses, inter alia, a polymerization process comprising the steps in combination of dispersing a mixture of isobutylene and a polyolefin having 4 to 14 carbon atoms per molecule, into a body of a fluorine substituted aliphatic hydrocarbon containing material without substantial solution therein, in the proportion of from one-half part to 10 parts of fluorine substituted aliphatic hydrocarbon having from one to five carbon atoms per molecule which is liquid at the polymerization temperature and polymerizing the dispersed mixture of isobutylene and polyolefin having four to fourteen carbon atoms per molecule at temperatures between −20° C. and −164° C. by the application thereto a Friedel-Crafts catalyst. However, '698 teaches that the suitable fluorocarbons would result in a biphasic system with the monomer, comonomer and catalyst being substantially insoluble in the fluorocarbon making their use difficult and unsatisfactory.

U.S. Pat. No. 2,548,415 discloses, inter alia, a continuous polymerization process for the preparation of a copolymer, the steps comprising continuously delivering to a polymerization reactors a stream consisting of a major proportion of isobutylene and a minor proportion isoprene; diluting the mixture with from ½ volume to 10 volumes of ethylidene difluoride; copolymerizing the mixture of isobutylene isoprene by the continuous addition to the reaction mixture of a liquid stream of previously prepared polymerization catalyst consisting of boron trifluoride in solution in ethylidene difluoride, maintaining the temperature between −40° C. and −103° C. throughout the entire copolymerization reaction . . . . '415 teaches the use of boron trifluoride and its complexes as the Lewis acid catalyst and 1,1-difluoroethane as a preferred combination. This combination provides a system in which the catalyst, monomer and comonomer are all soluble and yet still affords a high degree of polymer insolubility to capture the benefits of reduced reactor fouling. However, boron trifluoride is not a preferred commercial catalyst for butyl polymers for a variety of reasons.

U.S. Pat. No. 2,644,809 teaches, inter alia, a polymerization process comprising the steps in combination of mixing together a major proportion of a monoolefin having 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluoromethane, dichloromethane, trichloromonofluormethane, dichloromonofluormethane, dichlorotetrafluorethane, and mixtures thereof, the monoolefin and multiolefin being dissolved in said liquid, and carrying out the polymerization at a temperature between −20° C. and the freezing point of the liquid. '809 discloses the utility of chlorofluorocarbons at maintaining ideal slurry characteristics and minimizing reactor fouling, but teaches the incorporation of diolefin (i.e. isoprene) by the addition of chlorofluorocarbons (CFC). CFC's are known to be ozone-depleting chemicals. Governmental regulations, however, tightly controls the manufacture and distribution of CFC's making these materials unattractive for commercial operation.

Additionally, Thaler, W. A., Buckley, Sr., D. J., *High Molecular-Weight, High Unsaturation Copolymers of Isobutylene and Conjugated Dienes*, 49(4) Rubber Chemical Technology, 960 (1976), discloses, inter alia, the cationic slurry polymerization of copolymers of isobutylene with isoprene (butyl rubber) and with cyclopentadiene in heptane.

Therefore, finding alternative diluents or blends of diluents to create new polymerization systems that would reduce particle agglomeration and/or reduce the amount of chlorinated hydrocarbons such as methyl chloride is desirable. Such new polymerization systems would reduce particle agglomeration and reactor fouling without having to compromise process parameters, conditions, or components and/or without sacrificing productivity/throughput and/or the ability to produce high molecular weight polymers. Additionally, finding new polymers associated with the aforementioned processes would help supply the world's increasing demand for elastomers and/or also provide for new end use applications.

Hydrofluorocarbons (HFC's) are chemicals that are currently used as environmentally friendly refrigerants because they have a very low (even zero) ozone depletion potential. Their low ozone depletion potential is thought to be related to the lack of chlorine. The HFC's also typically have low flammability particularly as compared to hydrocarbons and chlorinated hydrocarbons.

Isobutylene/isoprene copolymerizations have been conducted under a variety of polymerizations conditions including different monomer feed ratios, temperatures, catalysts, and solvents or diluents. A number of these systems have been described. See e.g. *Cationic Polymerizations of Olefins: A Critical Inventory*, J. P. Kennedy, (10-12 and 86-137) Wiley-Interscience, New York, 1972, and *Carbocationic Polymerization*, J. P. Kennedy, E. Marechal, Wiley-Interscience, New York, 1982.

The copolymerization of isobutylene and isoprene has been conducted in solution and in slurry. Solution polymerizations often employ chlorinated hydrocarbons or mixtures of hydrocarbons and chlorinated hydrocarbons to serve as a solvent for the monomers, catalyst and the prepared copolymers. A typical example is ethyl chloride/hexane mixtures. In slurry copolymerization, a chlorinated hydrocarbon, usually methyl chloride, is used as a solvent for the monomers and catalyst, but the copolymer produced is insoluble in the diluent.

The sequence distribution, characterization of the arrangement of the monomer units along polymer chain, of the prepared copolymers is influenced by the polymerization conditions as well as the intrinsic reactivity of the comonomers employed. The sequence distribution of a copolymer may be expressed in terms of combinations of adjacent structural units. For example, characterizable sequences of two monomer units are called diads. Three monomer unit sequences are called triads. Four monomer unit sequences are called tetrads and so forth. Copolymers prepared under different conditions with the same comonomer incorporation may exhibit differences in their sequence distributions as expressed by the diad (or triad, etc.) fractions in the copolymer chain. Sequence distributions and comonomer incorporation are mathematically linked by probability statistics because of the competitive nature of the chemical events involved in copolymerization. A parameter that aids in the characterization of this relationship is the reactivity ratio, a ratio of the rate constants of homopropagation (adding a like monomer) to cross propagation (adding an unlike monomer). Copolymers with the same comonomer incorporation, but with different sequence distributions often exhibit different physical properties. See e.g. *Chemical Microstructure of Polymer Chains*, J. L. Koenig, Wiley-Interscience, New York, 1980, and *Polymer Sequence Determination: Carbon-13 NMR Method*, J. C. Randall, Academic Press, 1977. An extreme, but clarifying example is the comparison of the physical attributes of random and block copolymers.

It is generally known that conjugated dienes are less reactive than isobutylene in carbocationic copolymerization systems. Of the known linear conjugated dienes, isoprene is one of the more reactive dienes in copolymerization with isobutylene. This tendency towards lower reactivity of the conjugated diene is expressed in the sequence distribution of the prepared copolymers. At a given copolymer composition, isoprene units do not exhibit a tendency to follow other isoprene units in the copolymer chain. Consequently, BII (B=isobutylene, I=isoprene), IIB and III triad fractions are relatively low than compared to systems with more reactive comonomers.

Because isobutylene/isoprene copolymerations are often conducted in chlorinated hydrocarbons or mixtures of hydrocarbons and chlorinated hydrocarbons, the degree to which the sequence distribution can be varied is quite limited. Expression of this limitation is found by examination of the known reactivity ratios of isoprene for isobutylene/isoprene copolymerizations See e.g., J. E. Puskas, "Carbocationic Polymerizations" in *Encyclopedia of Polymer Science and Technology*, (DOI: 10.1002/0471440264.pst040) John Wiley & Sons, New York, 2003. Values for isoprene reactivity ratios, $r_{IP}$, under a variety of polymerization conditions fall below 1.4 indicating a narrow range of available isoprene centered triad fractions (BII, IIB and III) in the prepared copolymers. Finding a polymerization system in which different concentrations of isoprene centered triad fraction can be prepared at a given comonomer incorporation is desirable for preparing copolymers suitable for the simultaneous introduction of crosslinking sites and functional groups.

Other background references include WO 02/34794 that discloses a free radical polymerization process using hydrofluorocarbons. Other background references include DE 100 61 727 A, WO 02/096964, WO 00/04061, U.S. Pat. Nos. 5,624,878, 5,527,870, and 3,470,143.

SUMMARY OF THE INVENTION

The invention provides for new polymerization processes comprising diluents comprising hydrofluorocarbons and their use to produce novel polymers with new sequence distributions. In particular, the invention provides for copolymers comprising an isoolefin, preferably isobutylene, and a multiolefin, preferably a conjugated diene, more preferably isoprene, with new sequence distributions.

In invention provides for a copolymer comprising an isoolefin, preferably isobutylene, and a multiolefin, preferably a conjugated diene, preferably isoprene, the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 1.5.

In the previous embodiment, m may be from greater than 2.0.

In the previous embodiment, m may be from greater than 2.5.

In the previous embodiment, m may be from greater than 3.5.

In another aspect of the invention, the invention provides for a copolymer comprising an isoolefin, preferably isobutylene, and a multiolefin, preferably a conjugated diene, even more preferably isoprene, the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from 1.10 to 1.25.

In the previous embodiment, m may be from 1.15 to 1.20.
In the previous embodiment, m may be from 1.15 to 1.25.
In the previous embodiment, m may be about 1.20.

In another aspect of the invention, the invention provides for a copolymer produced by the process comprising contacting an isoolefin, preferably isobutylene, a multiolefin, preferably a conjugated diene, even more preferably isoprene, one or more Lewis acid(s), one or more initiator(s), and a diluent comprising one or more hydrofluorocarbon(s) (HFC's); the copolymer having a copolymer sequence distribution defined by:

$$F=mA/(1+mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 1.5 or m is from 1.10 to 1.25.

In the previous embodiment, m may be from greater than 2.0.

In the previous embodiment, m may be from greater than 2.5.

In the previous embodiment, m may be from greater than 3.5.

In the previous embodiment, m may be from 1.15 to 1.20.
In the previous embodiment, m may be from 1.15 to 1.25.
In the previous embodiment, m may be m is about 1.20.

In any of the previous embodiments, the copolymer may be halogenated to form a halogenated copolymer.

In any of the previous embodiments, when present, the halogenated copolymer is halogenated with chlorine or bromine.

In any of the previous embodiments, when present, the halogen content is greater than 0.5 wt % based upon the weight of the halogenated copolymer.

In any of the previous embodiments, when present, the halogen content is from 0.5 wt % to 3.0 wt % based upon the weight of the halogenated copolymer.

In any of the previous embodiments, the copolymer has a Mw of from greater than 50,000.

In any of the previous embodiments, the copolymer has a Mw of from greater than 100,000.

In any of the previous embodiments, the copolymer has a Mw of from greater than 500,000.

In any of the previous embodiments, the copolymer has a Mw of from greater than 1,000,000.

In any of the previous embodiments, the copolymer has a MWD of from greater than 2.

In any of the previous embodiments, the copolymer has a MWD of from 2 to 6.

In any of the previous embodiments, the copolymer has a Mooney viscosity of at least 20±5 (ML 1+8 at 125° C., ASTM D 1646).

In any of the previous embodiments, the copolymer has a Mooney viscosity of from 20±5 to 60±5 (ML 1+8 at 125° C., ASTM D 1646).

In any of the previous embodiments, the multiolefin, or conjugated diene, or isoprene, when present, content is from greater than 0.5 mol %.

In any of the previous embodiments, the multiolefin, or conjugated diene, or isoprene, when present, content is from greater than 1.0 mol %.

In any of the previous embodiments, the multiolefin, or conjugated diene, or isoprene, when present, content is from greater than 2.5 mol %.

In any of the previous embodiments, the multiolefin, or conjugated diene, or isoprene, when present, content is from greater than 5.0 mol %.

The invention also provides for a blend comprising the copolymer of any of the previous embodiments and a secondary rubber selected from the group consisting of at least one of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, isobutylene/cyclopentadiene copolymer rubber, isobutylene/methyl cyclopentadiene copolymer rubber, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-α-methylstyrene) halogenated poly(isobutylene-co-isoprene-co-α-methylstyrene), and mixtures thereof.

This invention also relates to a polymerization process comprising contacting one or more monomers, one or more Lewis acids and one or more initiators in the presence of a diluent comprising one or more hydrofluorocarbons (HFC's) in a reactor under polymerization conditions.

In another embodiment, this invention relates to a process to produce polymers of monomer(s) comprising contacting, in a reactor, the monomer(s) and a Lewis acid in the presence of a hydrofluorocarbon diluent, wherein the Lewis acid is not a compound represented by formula $MX_3$, where M is a group 13 metal, X is a halogen.

In one embodiment, the invention provides a polymerization medium suitable to polymerize one or more monomer(s) to form a polymer, the polymerization medium comprising one or more Lewis acid(s), one or more initiator(s), and a diluent comprising one or more hydrofluorocarbon(s) (HFC's).

In another embodiment, the invention provides a polymerization medium suitable to polymerize one or more monomer(s) to form a polymer, the polymerization medium comprising one or more Lewis acid(s) and a diluent comprising one or more hydrofluorocarbon(s) (HFC); wherein the one or more Lewis acid(s) is not a compound represented by formula $MX_3$, where M is a group 13 metal and X is a halogen.

In preferred embodiments, the polymerization processes and media as described in any of the embodiments above produce polymers that include (poly)isobutylene homopolymers, isobutylene-isoprene (butyl rubber) copolymers, isobutylene and alkylstyrene copolymers, and star-branched butyl rubber terpolymers.

DRAWINGS

DETAILED DESCRIPTION

Figure 1:
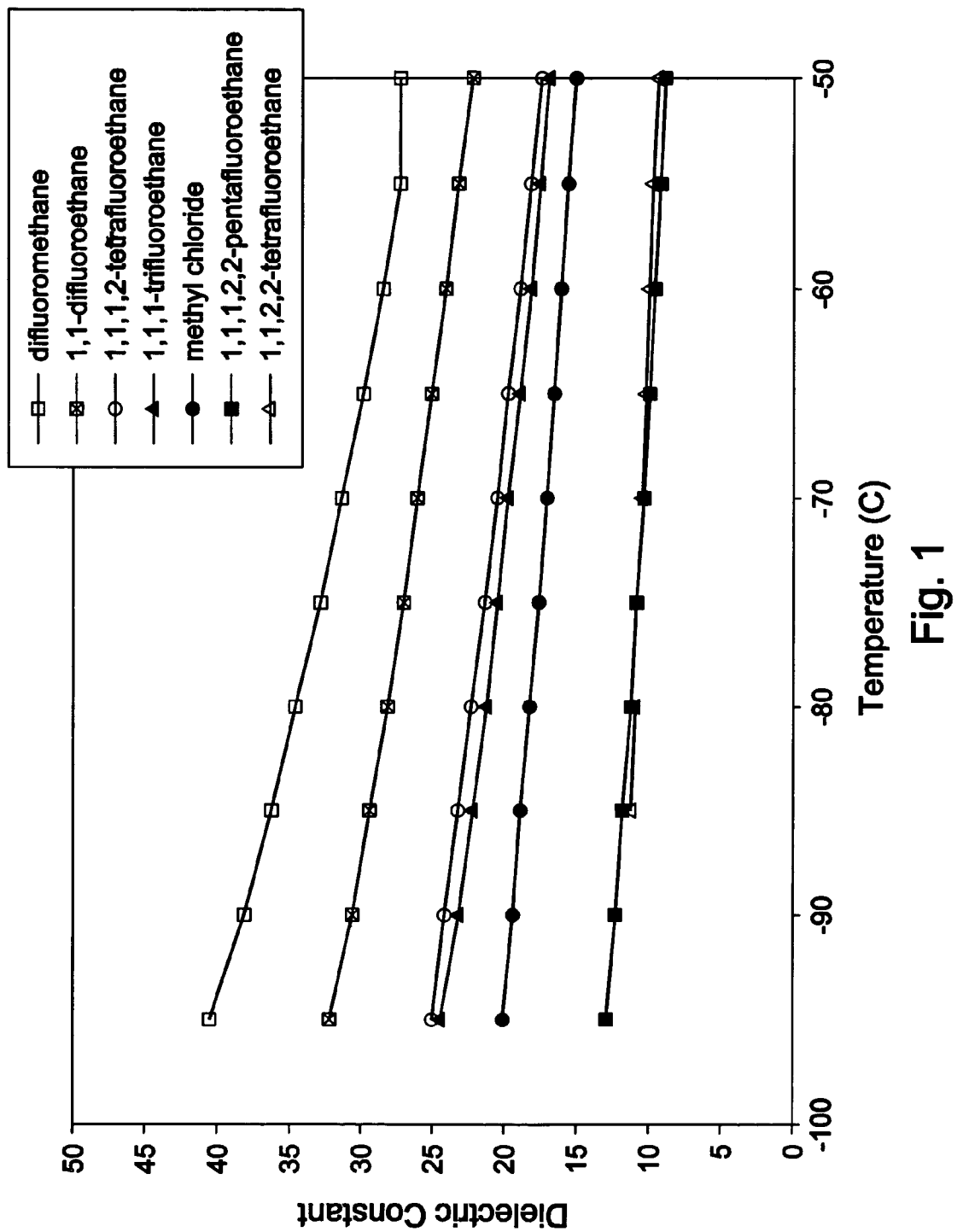
FIG. 1 is a graph of the relationship between dielectric constant and temperature.

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

For purposes of this invention and the claims thereto the term catalyst system refers to and includes any Lewis acid(s) or other metal complex(es) (described herein) used to catalyze the polymerization of the olefinic monomers of the invention, as well as at least one initiator, and optionally other minor catalyst component(s).

In one embodiment, the invention provides a polymerization medium suitable to polymerize one or more monomer(s) to form a polymer, the polymerization medium comprising one or more Lewis acid(s), one or more initiator(s), and a diluent comprising one or more hydrofluorocarbon(s) (HFC's).

In another embodiment, the invention provides a polymerization medium suitable to polymerize one or more monomer(s) to form a polymer, the polymerization medium comprising one or more Lewis acid(s) and a diluent comprising one or more hydrofluorocarbon(s) (HFC); wherein the one or more Lewis acid(s) is not a compound represented by formula $MX_3$, where M is a group 13 metal and X is a halogen.

The phrase "suitable to polymerize monomers to form a polymer" relates to the selection of polymerization conditions and components, well within the ability of those skilled in the art necessary to obtain the production of a desired polymer in light of process parameters and component properties described herein. There are numerous permutations of the polymerization process and variations in the polymerization components available to produce the desired polymer attributes. In preferred embodiments, such polymers include polyisobutylene homopolymers, isobutylene-isoprene (butyl rubber) copolymers, isobutylene and para-methylstyrene copolymers, and star-branched butyl rubber terpolymers.

Diluent means a diluting or dissolving agent. Diluent is specifically defined to include chemicals that can act as solvents for the Lewis Acid, other metal complexes as herein described, initiators, monomers or other additives. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc. to any appreciable extent. Additionally, the term diluent includes mixtures of at least two or more diluents.

A reactor is any container(s) in which a chemical reaction occurs.

Slurry refers to a volume of diluent comprising monomers that have precipitated from the diluent, monomers, Lewis acid, and initiator. The slurry concentration is the volume percent of the partially or completely precipitated polymers based on the total volume of the slurry.

As used herein, the new numbering scheme for the Periodic Table Groups are used as in CHEMICAL AND ENGINEERING NEWS, 63(5), 27 (1985).

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds.

Elastomer or elastomeric composition, as used herein, refers to any polymer or composition of polymers consistent with the ASTM D1566 definition. The terms may be used interchangeably with the term "rubber(s)", as used herein.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

In one embodiment, this invention relates to the use of hydrofluorocarbon(s) or blends of hydrofluorocarbon(s) with hydrocarbon(s) and/or chlorinated hydrocarbon(s) to produce a polymer slurry which is less prone to fouling (i.e., also observed more glass like, less sticky particles in the reaction vessel with reduced adherence to the walls of the vessel or to the stirring impeller as well as reduced particle to particle agglomeration). More particularly, this invention relates to the use of hydrofluorocarbon diluent(s) or HFC diluent blends with hydrocarbons and/or chlorinated hydrocarbon blends to polymerize and copolymerize isoolefins with dienes and/or alkylstyrenes to produce isoolefin homopolymers and copolymers with significantly reduced reactor fouling. Further, this invention relates to the use of hydrofluorocarbon diluent(s) or diluent blends with hydrocarbons and/or chlorinated hydrocarbon blends to polymerize and copolymerize isoolefins with dienes to produce isoolefin copolymers with significantly reduced reactor fouling and hence longer run life for the reactors, as compared to conventional systems.

In another embodiment, the hydrofluorocarbons are used in a tubular reactor to obtain reduced polymer accumulation on the heat transfer tubes and/or reduce polymer accumulation on the impeller and thus obtain longer run life.

In another embodiment, the hydrofluorocarbons are used in a tubular reactor at higher temperatures to produce polymers at much greater run lengths (such as greater than 15 hours, preferably greater than 20 hours, preferably greater than 30 hours, more preferably greater than 48 hours than possible with other halogenated hydrocarbons.

In another embodiment the hydrofluorocarbons are used in an autorefrigerated boiling-pool reactor where heat is removed by evaporation of the diluent and monomers mixture to reduce reactor wall fouling, and agitator/impeller fouling among other things.

In another preferred embodiment the hydrofluorocarbons are used in a polymerization process to obtain higher molecular weights at the same temperature than when other halogenated hydrocarbons are used.

In one embodiment, this invention relates to the discovery of new polymerization systems using diluents containing hydrofluorocarbons. These diluents effectively dissolve the selected catalyst system and monomers but are relatively poor solvents for the polymer product. Polymerization systems using these diluents are less prone to fouling due to the agglomeration of polymer particles to each other and their depositing on polymerization hardware. In addition, this invention further relates to the use of these diluents in polymerization systems for the preparation of high molecular weight polymers and copolymers at equivalent to or higher than to those polymerization temperatures using solely chlorinated hydrocarbon diluents such as methyl chloride.

In another embodiment, this invention relates to the discovery of new polymerization systems using fluorinated aliphatic hydrocarbons capable of dissolving the catalyst system. These polymerization systems are also beneficial for isoolefin slurry polymerization and production of a polymer slurry that is less prone to fouling, while permitting dissolution of monomer, comonomer and the commercially preferred alkylaluminum halide catalysts. In addition, this invention further relates to the use of these diluents for the preparation of high molecular weight polymers and copolymers at higher polymerization temperatures as compared to polymerization systems using solely chlorinated hydrocarbon diluents such as methyl chloride.

In yet another embodiment, this invention relates to the preparation of isoolefinic homopolymers and copolymers, especially the polymerization reactions required to produce the isobutylene-isoprene form of butyl rubber and isobutylene-p-alkylstyrene copolymers. More particularly, the invention relates to a method of polymerizing and copolymerizing isoolefins in a slurry polymerization process using hydrofluorocarbon diluents or blends of hydrofluorocarbons, and chlorinated hydrocarbon diluents, like methyl chloride.

In another embodiment, the polymerization systems of the present invention provide for copolymerizing an isomonoolefin having from 4 to 7 carbon atoms and para-alkylstyrene monomers. In accordance with a preferred embodiment of the invention, the system produces copolymers containing between about 80 and 99.5 wt. % of the isoolefin such as isobutylene and between about 0.5 and 20 wt. % of the para-alkylstyrene such as para-methylstyrene. In accordance with another embodiment, however, where glassy or plastic materials are being produced as well, the copolymers are comprised between about 10 and 99.5 wt. % of the isoolefin, or isobutylene, and about 0.5 and 90 wt. % of the para-alkylstyrene, such as para-methylstyrene.

In a preferred embodiment this invention relates to a process to produce polymers of cationically polymerizable monomer(s) comprising contacting, in a reactor, the monomer(s), a Lewis acid, and an initiator, in the presence of an HFC diluent at a temperature of 0° C. or lower, preferably −10° C. or lower, preferably −20° C. or lower, preferably −30° C. or lower, preferably −40° C. or lower, preferably −50° C. or lower, preferably −60° C. or lower, preferably −70° C. or lower, preferably −80° C. or lower, preferably −90° C. or lower, preferably −100° C. or lower, preferably from 0° C. to the freezing point of the polymerization medium, such as the diluent and monomer mixture.

Monomers and Polymers

Monomers which may be polymerized by this system include any hydrocarbon monomer that is polymerizable using this invention. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used a monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group. For a detailed discussion of cationic catalysis please see *Cationic Polymerization of Olefins, A Critical Inventory*, Joseph Kennedy, Wiley Interscience, New York 1975.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers listed in this Section. Examples of homopolymers include polyisobutylene, polypara-methylstyrene, polyisoprene, polystyrene, polyalpha-methylstyrene, polyvinyl ethers (such as polymethylvinylether, polyethylvinylether).

Preferred polymers also include copolymers of 1) isobutylene and an alkylstyrene; and 2) isobutylene and isoprene.

In one embodiment butyl polymers are prepared by reacting a comonomer mixture, the mixture having at least (1) a $C_4$ to $C_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. One embodiment of the butyl rubber polymer of the invention is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment. The following table illustrates how the above-referenced wt % would be expressed as mol %.

| wt % IC4[a] | mol % IC4 | wt % IC5[b] | Mol % IC5 |
|---|---|---|---|
| 70 | 73.9 | .5 | .4 |
| 85 | 87.3 | 5 | 4.2 |
| 92 | 93.3 | 8 | 6.7 |
| 95 | 95.9 | 15 | 12.7 |
| 99.5 | 99.6 | 30 | 26.1 |

[a]IC4 - isobutylene
[b]IC5 - isoprene

For the purposes of this invention, the relationship between the triad fraction of an isoolefin and a multiolefin and the mol % or multiolefin incorporated into the copolymer is described by the copolymer sequence distribution equation described below and is characterized by the copolymer sequence distribution parameter, m.

$$F = mA/(1+mA)^2$$

where: m is the copolymer sequence distribution parameter,

A is the molar ratio of multiolefin to isoolefin in the copolymer and,

F is the isoolefin-multiolefin-multiolefin triad fraction in the copolymer.

In certain embodiments, m is from greater than 1.5; alternatively, from greater than 2.0; alternatively, from greater than 2.5; alternatively, from greater than 3.0; and alternatively, from greater than 3.5.

In other embodiments, m is from 1.10 to 1.25; alternatively, from 1.15 to 1.20; alternatively, from 1.15 to 1.25; and alternatively, m is about 1.20.

This invention further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably paramethyl styrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Lewis Acid

In a preferred embodiment the Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the invention. In one embodiment, the metals are aluminum, boron and titanium, with aluminum being desirable. Illustrative examples include $AlCl_3$, (alkyl)$AlCl_2$, $(C_2H_5)_2AlCl$ and $(C_2H_5)_3Al_2Cl_3$, $BF_3$, $SnCl_4$, $TiCl_4$. In a particularly preferred embodiment, $BF_3$ is not the chosen Lewis acid.

The Group 4, 5 and 14 Lewis acids have the general formula $MX_4$; wherein M is Group 4, 5, or 14 metal; and X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in this invention may also have the general formula $MR_nX_{4-n}$; wherein M is Group 4, 5, or 14 metal; wherein R is a monovalent hydrocarbon radical selected from the group consisting of $C_1$ to $C_{12}$ alkyl, aryl, arylalkyl, alkylaryl and cycloalkyl radicals; and n is an integer from 0 to 4; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkyl" refers to a radical containing both aliphatic and aromatic structures, the radical being at an alkyl position. The term "alkylaryl" refers to a radical containing both aliphatic and aromatic structures, the radical being at an aryl position. Non-limiting examples of these Lewis acids include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in this invention may also have the general formula $M(RO)_nR'_mX_{4-(m+n)}$; wherein M is Group 4, 5, or 14 metal, wherein RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals as defined above; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position. The term "alkylaryl" refers to a radical containing both aliphatic and aromatic structures, the radical being at an aryloxy position. Non-limiting examples of these Lewis acids include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 4, 5 and 14 Lewis acids useful in this invention may also have the general formula $M(RC=OO)_nR'_mX_{4-(m+n)}$; wherein M is Group 4, 5, or 14 metal; wherein $RC=OO$ is a monovalent hydrocarbacyl radical selected from the group consisting of $C_2$ to $C_{30}$ alkacyloxy, arylacyloxy, arylalkylacyloxy, alkylarylacyloxy radicals; R' is a monovalent hydrocarbon radical selected from the group consisting of $C_1$ to $C_{12}$ alkyl, aryl, arylalkyl, alkylaryl and cycloalkyl radicals as defined above; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkylacyloxy" refers to a radical containing both aliphatic and aromatic structures, the radical being at an alkyacyloxy position. The term "alkylarylacyloxy" refers to a radical containing both aliphatic and aromatic structures, the radical being at an arylacyloxy position. Non-limiting examples of these Lewis acids include acetoxytitanium trichloride, benzoylzirconium tribromide, benzoyloxytitanium trifluoride, isopropoyloxytin trichloride, methyl acetoxytitanium dichloride and benzyl benzoyloxyvanadium chloride.

Group 5 Lewis acids useful in this invention may also have the general formula $MOX_3$; wherein M is a Group 5 metal; wherein X is a halogen independently selected from the group consisting of fluorine, chlorine, bromine, and iodine, preferably chlorine. A non-limiting example is vanadium oxytrichloride.

The Group 13 Lewis acids useful in this invention have the general formula $MX_3$; wherein M is a Group 13 metal and X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. Non-limiting examples include aluminum trichloride, boron trifluoride, gallium trichloride, and indium trifluoride.

Group 13 Lewis acids useful in this invention may also have the general formula: $MR_nX_{3-n}$ wherein M is a Group 13 metal; R is a monovalent hydrocarbon radical selected from the group consisting of $C_1$ to $C_{12}$ alkyl, aryl, arylalkyl, alkylaryl and cycloalkyl radicals; and n is an number from 0 to 3; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkyl" refers to a radical containing both aliphatic and aromatic structures, the radical being at an alkyl position. The term "alkylaryl" refers to a radical containing both aliphatic and aromatic structures, the radical being at an aryl position. Non-limiting examples of these Lewis acids include ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum and triethylaluminum.

Group 13 Lewis acids useful in this invention may also have the general formula $M(RO)_nR'_mX_{3-(m+n)}$; wherein M is a Group 13 metal; wherein RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals as defined above; n is a number from 0 to 3 and m is an number from 0 to 3 such that the sum of n and m is not more than 3; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position. The term "alkylaryl" refers to a radical containing both aliphatic and aromatic structures, the radical being at an aryloxy position. Non-limiting examples of these Lewis acids include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Group 13 Lewis acids useful in this invention may also have the general formula $M(RC=OO)_nR'_mX_{3-(m+n)}$; wherein M is a Group 13 metal; wherein RC=OO is a monovalent hydrocarbacyl radical selected from the group selected from the group consisting of $C_2$ to $C_{30}$ alkacyloxy, arylacyloxy, arylalkylacyloxy, alkylarylacyloxy radicals; R' is a monovalent hydrocarbon radical selected from the group consisting of $C_1$ to $C_{12}$ alkyl, aryl, arylalkyl, alkylaryl and cycloalkyl radicals as defined above; n is a number from 0 to 3 and m is a number from 0 to 3 such that the sum of n and m is not more than 3; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkylacyloxy" refers to a radical containing both aliphatic and aromatic structures, the radical being at an alkyacyloxy position. The term "alkylarylacyloxy" refers to a radical containing both aliphatic and aromatic structures, the radical being at an arylacyloxy position. Non-limiting examples of these Lewis acids include acetoxyaluminum dichloride, benzoyloxyaluminum dibromide, benzoyloxygallium difluoride, methyl acetoxyaluminum chloride, and isopropoyloxyindium trichloride.

The Group 15 Lewis acids have the general formula $MX_y$, wherein M is a Group 15 metal and X is a halogen independently selected from the group consisting of fluorine, chlorine, bromine, and iodine, preferably chlorine and y is 3, 4 or 5. X may also be a psuedohalogen. For the purposes of this invention and the claims thereto pseudohalogen is defined to be an azide, an isocyanate, a thiocyanate, an isothiocyanate or a cyanide. Non-limiting examples include antimony hexachloride, antimony hexafluoride, and arsenic pentafluoride. The Group 15 Lewis acids may also contain more than one type of halogen. Non-limiting examples include antimony chloride pentafluoride, arsenic trifluoride, bismuth trichloride and arsenic fluoride tetrachloride.

Group 15 Lewis acids useful in this invention may also have the general formula $MR_nX_y{-}n$; wherein M is a Group 15 metal; wherein R is a monovalent hydrocarbon radical selected from the group consisting of $C_1$ to $C_{12}$ alkyl, aryl, arylalkyl, alkylaryl and cycloalkyl radicals; and n is an integer from 0 to 4; y is 3, 4 or 5 such that n is less than y; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkyl" refers to a radical containing both aliphatic and aromatic structures, the radical being at an alkyl position. The term "alkylaryl" refers to a radical containing both aliphatic and aromatic structures, the radical being at an aryl position. Non-limiting examples of these Lewis acids include tetraphenylantimony chloride and triphenylantimony dichloride.

Group 15 Lewis acids useful in this invention may also have the general formula $M(RO)_nR'_mX_{y-(m+n)}$; wherein M is a Group 15 metal, wherein RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. For the purposes of this invention, one skilled in the art would recognize that the terms alkoxy and aryloxy are structural equivalents to alkoxides and phenoxides respectively. The term "arylalkoxy" refers to a radical containing both aliphatic and aromatic structures, the radical being at an alkoxy position. The term "alkylaryl" refers to a radical containing both aliphatic and aromatic structures, the radical being at an aryloxy position. Non-limiting examples of these Lewis acids include tetrachloromethoxyantimony, dimethoxytrichloroantimony, dichloromethoxyarsine, chlorodimethoxyarsine, and difluoromethoxyarsine.

Group 15 Lewis acids useful in this invention may also have the general formula $M(RC=OO)_nR'_mX_{y-(m+n)}$; wherein M is a Group 15 metal; wherein RC=OO is a monovalent hydrocarbacyloxy radical selected from the group consisting of $C_2$ to $C_{30}$ alkacyloxy, arylacyloxy, arylalkylacyloxy, alkylarylacyloxy radicals; R' is a monovalent hydrocarbon radical selected from the group consisting of $C_1$ to $C_{12}$ alkyl, aryl, arylalkyl, alkylaryl and cycloalkyl radicals as defined above; n is an integer from 0 to 4 and m is an integer from 0 to 4 and y is 3, 4 or 5 such that the sum of n and m is less than y; X is a halogen independently selected from the group consisting of fluorine, chlorine, bromine, and iodine, preferably chlorine. X may also be a psuedohalogen. For the purposes of this invention and the claims thereto pseudohalogen is defined to be an azide, an isocyanate, a thiocyanate, an isothiocyanate or a cyanide. The term "arylalkylacyloxy" refers to a radical containing both aliphatic and aromatic structures, the radical being at an alkyacyloxy position. The term "alkylarylacyloxy" refers to a radical containing both aliphatic and aromatic structures, the radical being at an arylacyloxy position. Non-limiting examples of these Lewis acids include acetatotetrachloroantimony, (benzoato) tetrachloroantimony, and bismuth acetate chloride.

Particularly preferred Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the invention.

Initiator

Initiators useful in this invention are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalyst systems, such as when activated with weakly coordinating Lewis acids or Lewis acid salts have been used to initiate isobutylene polymerization.

In one embodiment, the reactor and the catalyst system are substantially free of water. Substantially free of water is defined as less than 30 ppm (based upon total weight of the catalyst system), preferably less than 20 ppm, preferably less than 10 ppm, preferably less than 5 ppm, preferably less than 1 ppm. However, when water is selected as an initiator, it is added to the catalyst system to be present at greater than 30 ppm, preferably greater than 40 ppm, and even more preferably greater than 50 ppm (based upon total weight of the catalyst system).

In a preferred embodiment the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide.

Preferred hydrogen halide initiators include hydrogen chloride, hydrogen bromide and hydrogen iodide. A particularly preferred hydrogen halide is hydrogen chloride.

Preferred carboxylic acids included both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid.

Carboxylic acid halides useful in this invention are similar in structure to carboxylic acids with the substitution of a halide for the OH of the acid. The halide may be fluoride, chloride, bromide, or iodide, with the chloride being preferred. Preparation of acid halides from the parent carboxylic acids are known in the prior art and one skilled in the art should be familiar with these procedures. Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alcohols useful in this invention include methanol, ethanol, propanol, 2-propanol, 2-methylpropan-2-ol, cyclohexanol, and benzyl alcohol. Phenols useful in this invention include phenol; 2-methylphenol; 2,6-dimethylphenol; p-chlorophenol; p-fluorophenol; 2,3,4,5,6-pentafluorophenol; and 2-hydroxynaphthalene.

Preferred tertiary alkyl and aralkyl initiators include tertiary compounds represented by the formula below:

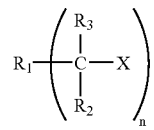

wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound containing both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl) benzene; 5-tert-butyl-1,3-bis(1-chloro-1-methylethyl) benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl) benzene; 5-tert-butyl-1,3-bis(1-acetoxy-1-methylethyl) benzene; 2-methoxy-2,4,4-trimethylpentane 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl) benzene. Other suitable initiators can be found in U.S. Pat. No. 4,946,899, which is herein incorporated by reference. For the purposes of this invention and the claims thereto pseudohalogen is defined to be any compound that is an azide, an isocyanate, a thiocyanate, an isothiocyanate or a cyanide.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block copolymers.

Particularly preferred initiators may be any of those useful in cationic polymerization of isobutylene copolymers including: hydrogen chloride, 2-chloro-2,4,4-trimethylpentane, 2-chloro-2-methylpropane, 1-chloro-1-methylethylbenzene, and methanol.

Catalyst system compositions useful in this invention typically comprise (1) an initiator and (2) a Lewis acid coinitiator or other metal complex described herein. In a preferred embodiment, the Lewis acid coinitiator is present anywhere from about 0.1 moles times the moles of initiator present to about 200 times the moles of initiator present. In a further preferred embodiment, the Lewis acid coinitiator is present at anywhere from about 0.8 times the moles of initiator present to about 20 times the moles of initiator present. In a preferred embodiment the initiator is present at anywhere from about 0.1 moles per liter to about $10^{-6}$ moles per liter. It is of course understood that greater or lesser amounts of initiator are still within the scope of this invention.

The amount of the catalyst employed will depend on desired molecular weight and molecular weight distribution of the polymer being produced. Typically the range will be from about $1 \times 10^{-6}$ moles per liter to $3 \times 10^{-2}$ moles per liter and most preferably from $10^{-4}$ to $10^{-3}$ moles per liter.

Catalyst systems useful in this invention may further comprise a catalyst composition comprising of a reactive cation and a weakly-coordinating anion ("WC anion" or "WCA" or "NCA"). The catalyst composition comprising the WC anion will include a reactive cation and in certain instances are novel catalyst systems.

A weakly-coordinating anion is defined as an anion which either does not coordinate to the cation or which is weakly coordinated to the cation and when the anion is functioning as the stabilizing anion in this invention the WCA does not transfer an anionic fragment or substituent to the cation thus creating a neutral by-product or other neutral compound. Preferred examples of such weakly-coordinating anions include: alkyltris(pentafluorophenyl) boron ($RB(pfp)_3^-$), tetraperfluorophenylboron ($B(pfp)_4^-$), tetraperfluorophenylaluminum carboranes, halogenated carboranes and the like. The cation is any cation that can add to an olefin to create a carbocation.

The anion may be combined with the cation by any method known to those of ordinary skill in the art. For example in a preferred embodiment the WC anion is introduced into the diluent as a compound containing both the anion and the cation in the form of the active catalyst system. In another preferred embodiment a composition containing the WC anion fragment is first treated to produce the anion in the presence of the cation or reactive cation source, i.e. the anion is activated. Likewise the WC anion may be activated without the presence of the cation or cation source which is subsequently introduced. In a preferred embodiment a composition containing the anion and a composition containing the cation are combined and allowed to react to form a by-product, the anion and the cation.

Weakly-Coordinating Anions

Any metal or metalloid compound capable of forming an anionic complex which is incapable of transferring a substituent or fragment to the cation to neutralize the cation to produce a neutral molecule may be used as the WC anion. In addition any metal or metalloid capable of forming a coordination complex which is stable in water may also be used or contained in a composition comprising the anion. Suitable metals include, but are not limited to aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

In general, WC anions may be represented by the following general formula:

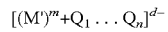

wherein:
M' is a metal or metalloid;
$Q_1$ to $Q_n$ are, independently, bridged or unbridged hydride radicals, dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, but not more than one of $Q_1$ to $Q_n$ may be a halide radical;
m is an integer representing the formal valence charge of M;
n is the total number of ligands q, and
d is an integer greater than or equal to 1.

It is of course understood that the anions described above and below may be counter balanced with a positively charged component that is removed before the anion acts with the cation. The same is true for cations described for use with the anions. For example, $Cp_2ZrMe_2$ may be combined with a composition comprising the anion ($WCA^-R^+$) where $R^+$ acts with a Me group to leave the $Cp_2Zr^+Me\ WCA^-$ catalyst system.

Preferred WC anions comprising boron may be represented by the following general formula:

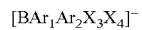

wherein:
B is a boron in a valence state of 3;
$Ar_1$ and $Ar_2$ are the same or different aromatic or substituted-aromatic hydrocarbon radicals containing from about 6 to about 20 carbon atoms and may be linked to each other through a stable bridging group; and
$X_3$ and $X_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that $X_3$ and $X_4$ will not be halide at the same time.

In general, $Ar_1$ and $Ar_2$ may, independently, be any aromatic of substituted-aromatic hydrocarbon radical. Suitable aromatic radicals include, but are not limited to, phenyl, naphthyl and anthracenyl radicals. Suitable substituents on the substituted-aromatic hydrocarbon radicals, include, but are not necessarily limited to, hydrocarbyl radicals, organometalloid radicals, alkoxy and aryloxy radicals, fluorocarbyl and fluorohydrocarbyl radicals and the like such as those useful as $X_3$ and $X_4$. The substituent may be ortho, meta or para, relative to the carbon atoms bonded to the boron atom. When either or both $X_3$ and $X_4$ are a hydrocarbyl radical, each may be the same or a different aromatic or substituted-aromatic radical as are $Ar_1$ and $Ar_2$, or the same may be a straight or branched alkyl, alkenyl or alkynyl radical, a cyclic hydrocarbon radical or an alkyl-substituted cyclic hydrocarbon radical. As indicated above, $Ar_1$ and $Ar_2$ could be linked to either $X_3$ or $X_4$. Finally, $X_3$ and $X_4$ may also be linked to each other through a suitable bridging group.

Illustrative, but not limiting, examples of boron components which may be used as WC anions are: tetravalent boron compounds such as tetra(phenyl)boron, tetra(p-tolyl)boron, tetra(o-tolyl)boron, tetra(pentafluorophenyl)boron, tetra(o,p-dimethylphenyl)boron, tetra(m,m-dimethylphenyl) boron, (p-tri-fluoromethylphenyl)boron and the like.

Similar lists of suitable components containing other metals and metalloids which are useful as WC anions may be made, but such lists are not deemed necessary to a complete disclosure. In this regard, it should be noted that the foregoing list is not intended to be exhaustive and that other useful boron compounds as well as useful compounds containing other metals or metalloids would be readily apparent to those skilled in the art from the foregoing general discussion and formulae.

A particularly preferred WC anion comprising boron may be represented by the following general formula:

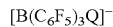

wherein:
F is fluorine, C is carbon and B, and Q are as defined above. Illustrative but not limiting, examples of these preferred WC anions comprising boron triphenylmethyl salts where Q is a simple hydrocarbyl such as methyl, butyl, cyclohexyl, or phenyl or where Q is a polymeric hydrocarbyl of indefinite chain length such as polystyrene, polyisoprene, or poly-paramethylstyrene.

Polymeric Q substituents on the most preferred anion offer the advantage of providing a highly soluble ion-exchange activator component and final catalyst. Soluble catalysts and/or precursors are often preferred over insoluble waxes, oils, or solids because they can be diluted to a desired concentration and can be transferred easily using simple equipment in commercial processes.

WC anions containing a plurality of boron atoms may be represented by the following general formulae:

or

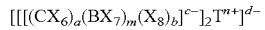

wherein:
X, X', X", $X_6$, $X_7$ and $X_8$ are, independently, hydride radicals, halide radicals, hydrocarbyl radicals, substituted-hydrocarbyl radicals, halocarbyl radicals, substituted-halocarbyl radicals, or hydrocarbyl- or halocarbyl-substituted organometalloid radicals;

T is a transition metal, preferably a group 8, 9, or 10 metal, preferably nickel, cobalt or iron;
a and b are integers $\geq 0$;
c is an integer $\geq 1$;
a+b+c=an even-numbered integer from 2 to about 8;
m is an integer ranging from 5 to about 22;
a and b are the same or a different integer 0;
c is an integer $\geq 2$;
a+b+c=an even-numbered integer from 4 to about 8;
m is an integer from 6 to about 12;
n is an integer such that 2c−n=d; and
d is an integer $\geq 1$.

Examples of preferred WC anions of this invention comprising a plurality of boron atoms include:
(1) A borane or carborane anion satisfying the general formula:

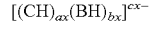

wherein:
ax is either 0 or 1;
cx is either 1 or 2;
ax+cx=2;
bx is an integer ranging from about 10 to 12; or
(2) A borane or carborane or a neutral borane or carborane compound satisfying the general formula:

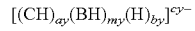

wherein:
ay is an integer from 0 to 2;
by is an integer from 0 to 3;
cy is an integer from 0 to 3;
ay+by+cy=4;
my is an integer from about 9 to about 18; or
(3) A metallaborane or metallacarborane anion satisfying the following general formula:

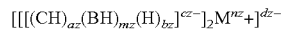

wherein:
az is an integer from 0 to 2;
bz is an integer from 0 to 2;
cz is either 2 or 3;
mz is an integer from about 9 to 11;
az+bz+cz=4; and
nz and dz are, respectively, 2 and 2 or 3 and 1.

Illustrative, but not limiting, examples of WC anions include:
carboranes such as dodecaborate, decachlorodecaborate, dodecachlorododecaborate, 1-carbadecaborate, 1-carbadecaborate, 1-trimethylsilyl-1-carbadecaborate;
Borane and carborane complexes and salts of borane and carborane anions such as decaborane(14), 7,8-dicarbadecaborane(13), 2,7-dicarbaundecaborane(13), undecahydrido-7,8-dimethyl-7,8-dicarbaundecaborane, 6-carbadecaborate(12), 7-carbaundecaborate, 7,8-dicarbaudecaborate; and
Metallaborane anions such as bis(nonahydrido-1,3-dicarbanonaborato)cobaltate(III), bis(undecahydrido-7,8-dicarbaundecaborato) ferrate(III), bis(undecahydrido-7,8-dicarbaundecaborato) cobaltate(III), bis(undecahydrido-7,8-dicarbaunaborato) nickelate(III), bis(nonahydrido-7,8-dimethyl-7,8-dicarbaundecaborato)ferrate(III), bis(tribromooctahydrido-7,8-dicarbaundecaborato)cobaltate(III), bis(undecahydridodicarbadodecaborato) cobaltate(III) and bis(undecahydrido-7-carbaundecaborato) cobaltate(III).

The WC anion compositions most preferred for forming the catalyst system used in this process are those containing a trisperfluorophenyl boron, tetrapentafluorphenyl boron anion and/or two or more trispentafluorophenyl boron anion groups covalently bond to a central atomic molecular or polymeric complex or particle.

Cationic Component

In various preferred embodiments of this invention the WC anion is combined with one or more cations that are selected from different classes of cations and cation sources.

Some preferred classes are:

(A) cyclopentadienyl transition metal complexes and derivatives thereof.

(B) a substituted carbocation whose composition is represented by the formula:

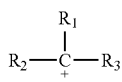

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof;

(C) substituted silylium; preferably those represented by the formula:

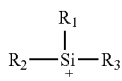

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof;

(D) compositions capable of generating a proton; and (E) cationic compositions of germanium, tin or lead, some of which are represented by the formula:

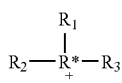

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, and R* is Ge, Sn or Pb.

A. Cyclopentadienyl Metal Derivatives

Preferred cyclopentadienyl transition metal derivatives include transition metals that are a mono-, bis- or tris-cyclopentadienyl derivative of a group 4, 5 or 6 transition metal, preferably a mono-cyclopentadienyl (Mono-Cp) or bis-cyclopentadienyl (Bis-Cp) group 4 transition metal compositions, particularly a zirconium, titanium or hafnium compositions.

Preferred cyclopentadienyl derivatives (cation sources) that may be combined with weakly-coordinating anions are represented by the following formulae:

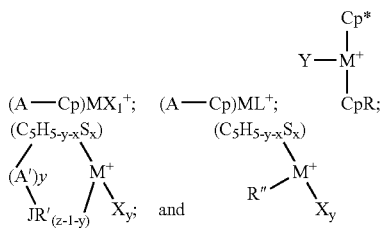

wherein:

(A-Cp) is either (Cp)(Cp*) or Cp-A'-Cp*;

Cp and Cp* are the same or different cyclopentadienyl rings substituted with from zero to five substituent groups S, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S groups are joined forming a $C_4$ to $C_{20}$ ring to give a saturated or unsaturated polycyclic cyclopentadienyl ligand;

R is a substituent on one of the cyclopentadienyl radicals which is also bonded to the metal atom;

A' is a bridging group, which group may serve to restrict rotation of the Cp and Cp* rings or $(C_5H_{5-y-x}S_x)$ and $JR'_{(z-1-y)}$ groups;

M is a group 4, 5, or 6 transition metal;

y is 0 or 1;

$(C_5H_{5-y-x}S_x)$ is a cyclopentadienyl ring substituted with from zero to five S radicals;

x is from 0 to 5 denoting the degree of substitution;

$JR'_{(z-1-y)}$ is a heteroatom ligand in which J is a group 15 element with a coordination number of three or a group 16 element with a coordination number of 2, preferably nitrogen, phosphorus, oxygen or sulfur;

R" is a hydrocarbyl group, preferably an alkyl group;

X and $X_1$ are independently a hydride radical, hydrocarbyl radical, substituted hydrocarbyl radical, halocarbyl radical, substituted halocarbyl radical, and hydrocarbyl- and halocarbyl-substituted organometalloid radical, substituted pnictogen radical, or substituted chalcogen radicals; and L is an olefin, diolefin or aryne ligand, or a neutral Lewis base.

Additional cyclopentadienyl compounds that may be used in this invention are described in U.S. Pat. Nos. 5,055,438, 5,278,119, 5,198,401 and 5,096,867, which are incorporated by reference herein.

B. Substituted Carbocations

Another preferred source for the cation is substituted carbocations. Preferred examples include substances that are represented by the formula:

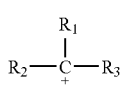

wherein $R_1$, $R_2$ and $R_3$ are independently hydrogen, or a linear, branched or cyclic aromatic or aliphatic groups, preferably a $C_1$ to $C_{20}$ aromatic or aliphatics group, provided that only one of $R_1$, $R_2$ or $R_3$ may be hydrogen. In a preferred embodiment none of $R_1$, $R_2$ or $R_3$ are H. Preferred aromatics include phenyl, toluyl, xylyl, biphenyl and the like. Preferred aliphatics include methyl, ethyl, propyl, butyl, pentyl, hexyl, octyl, nonyl, decyl, dodecyl, 3-methylpentyl, 3,5,5-trimethylhexyl and the like. In a particularly preferred embodiment, when $R_1$, $R_2$ and $R_3$ are phenyl groups, the addition of an aliphatic or aromatic alcohol significantly enhances the polymerization of isobutylene.

C. Substituted Silylium Cations

In another preferred embodiment, substituted silylium compositions, preferably trisubstituted silylium compositions are combined with WCA's to polymerize monomers. Preferred silylium cations are those represented by the formula:

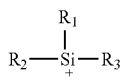

wherein $R_1$, $R_2$ and $R_3$, are independently hydrogen, or a linear, branched or cyclic aromatic or aliphatic group, with the proviso that only one of $R_1$, $R_2$ and $R_3$ may be hydrogen. Preferably, none of $R_1$, $R_2$ and $R_3$ are H. Preferably, $R_1$ $R_2$ and $R_3$ are, independently, a $C_1$ to $C_{20}$ aromatic or aliphatic group. More preferably, $R_1$, $R_2$ and $R_3$ are independently a $C_1$ to $C_8$ alkyl group. Examples of useful aromatic groups may be selected from the group consisting of phenyl, tolyl, xylyl and biphenyl. Non-limiting examples of useful aliphatic groups may be selected from the group consisting of methyl, ethyl, propyl, butyl, pentyl, hexyl, octyl, nonyl, decyl, dodecyl, 3-methylpentyl and 3,5,5-trimethylhexyl. A particularly preferred group of reactive substituted silylium cations may be selected from the group consisting of trimethylsilylium, triethylsilylium and benzyldimethylsilylium.

For a discussion of stable forms of the substituted silylium and synthesis thereof, see F. A. Cotton, G. Wilkinson, Advanced Inorganic Chemistry, John Wiley and Sons, New York 1980. Likewise for stable forms of the cationic tin, germanium and lead compositions and synthesis thereof, see Dictionary of Organometallic compounds, Chapman and Hall New York 1984.

D. Composition Capable of Generating a Proton

A fourth source for the cation is any compound that will produce a proton when combined with the weakly-coordinating anion or a composition containing a weakly-coordinating anion. Protons may be generated from the reaction of a stable carbocation salt which contains a weakly-coordinating, non-nucleophilic anion with water, alcohol or phenol present to produce the proton and the corresponding by-product, (ether in the case of an alcohol or phenol and alcohol in the case of water). Such reaction may be preferred in the event that the reaction of the carbocation salt is faster with the protonated additive as compared with its reaction with the olefin. Other proton generating reactants include thiols, carboxylic acids, and the like. Similar chemistries may be realized with silylium type catalysts. In a particularly preferred embodiment, when $R_1$, $R_2$ and $R_3$ are phenyl groups, the addition of an aliphatic or aromatic alcohol significantly enhances the polymerization of isobutylene.

Another method to generate a proton comprises combining a group 1 or group 2 metal, preferably lithium, with water, such as by means of in a wet diluent, in the presence of a Lewis base that does not interfere with polymerization, such as an olefin. It has been observed that when a Lewis base, such as isobutylene, is present with the group 1 or 2 metal and the water, a proton is generated. In a preferred embodiment the weakly-coordinating anion is also present in the "wet" diluent such that active catalyst is generated when the group 1 or 2 metal is added.

Active Catalyst System

A. Cyclopentadienyl Transition Metal Compounds

The Cp transition metal cations ($CpTm^+$) can be combined into an active catalyst in at least two ways. A first method is to combine a compound comprising the $CpTm^+$ with a second compound comprising the $WCA^-$ which then react to form by-product and the active "weakly-coordinating" pair. Likewise, the $CpTm^+$ compound may also be directly combined with the $WCA^-$ to form the active catalyst system. Typically the WCA is combined with the cation/cation source in ratios of 1 to 1, however ratios of 100 to 1 ($CpTm^+$ to WCA) also work in the practice of this invention.

Active cationic catalysts can be prepared by reacting a transition metal compound with some neutral Lewis acids, such as $B(C_6F_6)_{3n}$, which upon reaction with a hydrolyzable ligand (X) of the transition metal compound forms an anion, such as $([B(C_6F_5)_3(X)]^-)$, which stabilizes the cationic transition metal species generated by the reaction.

A novel aspect of this invention is the active carbocationic catalyst complex which is formed and which can be represented by the formulae:

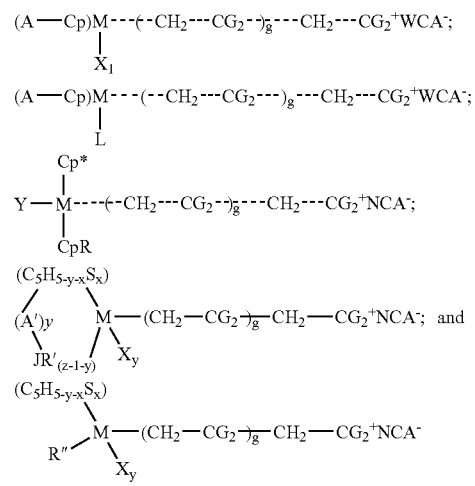

wherein each G is independently hydrogen or an aromatic or aliphatic group, preferably a $C_1$ to $C_{100}$ aliphatic group, and g is an integer representing the number of monomer units incorporated into the growing polymer chain, g is preferably a number greater than or equal to 1, preferably a number from 1 to about 150,000. $WCA^-$ is any weakly-coordinating anion as described above. All other symbols are as defined above.

In another embodiment this invention also provides active catalyst compositions which can be represented by the formulae:

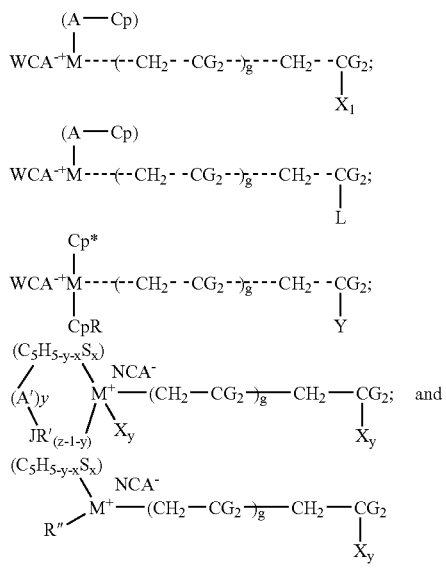

wherein each G is independently a aliphatic or aromatic group, preferably a $C_1$ to $C_{100}$ aliphatic or aromatic group, and g is a n integer representing the number of monomer units incorporated into the growing polymer chain, g is preferably a number greater than or equal to 1, preferably a number from 1 to about 50,000. WCA$^-$ is any weakly-coordinating anion as described above. All other symbols are as defined above.

B. Substituted Carbocation and Silylium Compounds

Generation of trisubstituted carbocations and silylium cations may be performed before use in the polymerization or in situ. Pre-formation and isolation of the cation or the stable cation salts may be accomplished by reacting the alkali or alkaline earth metal salt of the weakly-coordinating anion with the corresponding halogen of the potential carbocation or silylium similarly to methods known in the art. Formation of the substituted carbocations or silylium in situ occurs in a similar manner to stable salts, but within the vessel and at the desired temperature of polymerization. The advantage of the latter procedure is that it is capable of producing carbocations or silylium cations otherwise too unstable to be handled by the first method. The cation or the precursor to the cation is typically used in 1 to 1 ratios with the WCA, however ratios of 1 to 100 (C$^+$ or Si$^+$ to WCA) also work in the practice of this invention.

A novel aspect of this invention is the active carbocationic catalyst complex which is formed and which can be represented by the formulae:

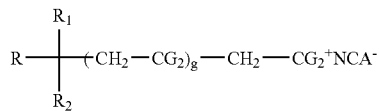

wherein each G is independently hydrogen or a hydrocarbyl group, preferably a $C_1$ to $C_{100}$ aliphatic group, and g is a n integer representing the number of monomer units incorporated into the growing polymer chain, g is preferably a number greater than or equal to 1, preferably a number from 1 to about 150,000. WCA$^-$ is any weakly-coordinating anion as described above. All other symbols are as defined above.

Yet another novel aspect of this invention is the active carbocationic catalyst complex which is formed and which can be represented by the formulae:

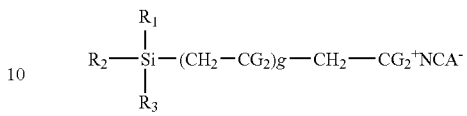

wherein each G is independently hydrogen or an aliphatic or aromatic group, preferably a $C_1$ to $C_{100}$ aliphatic group, and g is a n integer representing the number of monomer units incorporated into the growing polymer chain, g is preferably a number greater than or equal to 1, preferably a number from 1 to about 150,000. WCA$^-$ is any weakly-coordinating anion as described above. All other symbols are as defined above.

Ge, Sb, Pb

In addition cationic compositions of germanium, tin or lead, may be used in combination with the WCA's described herein. Preferred compositions include those which are represented by the formula:

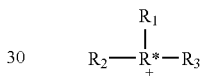

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, and R* is Ge, Sn or Pb. In a preferred embodiment the R groups are a $C_1$ to $C_{10}$ alkyl, preferably methyl, ethyl, propyl, or butyl.

Hydrofluorocarbons

Hydrofluorocarbons are preferably used as diluents in the present invention, alone or in combination with other hydrofluorocarbons or in combination with other diluents. For purposes of this invention and the claims thereto, hydrofluorocarbons ("HFC's" or "HFC") are defined to be saturated or unsaturated compounds consisting essentially of hydrogen, carbon and fluorine, provided that at least one carbon, at least one hydrogen and at least one fluorine are present.

In certain embodiments, the diluent comprises hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

Illustrative examples include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3, 3-pentafluoropropane; 1,1,2,2,3-pentafluoropropane; 1,1,2,3,3-pentafluoropropane; 1,1,1,2,2,3-hexafluoropropane; 1,1,1,2,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2 methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC's include difluoromethane, trifluoromethane, 1,1-difluoroethane, 1,1,1-trifluoroethane, fluoromethane, and 1,1,1,2-tetrafluoroethane.

Illustrative examples of unsaturated hydrofluorocarbons include vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4 tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

In one embodiment, the diluent comprises non-perfluorinated compounds or the diluent is a non-perfluorinated diluent. Perfluorinated compounds being those compounds consisting of carbon and fluorine. However, in another embodiment, when the diluent comprises a blend, the blend may comprise perfluorinated compound, preferably, the catalyst, monomer, and diluent are present in a single phase or the aforementioned components are miscible with the diluent as described in further detail below. In another embodiment, the blend may also comprise chlorofluorocarbons (CFC's), or those compounds consisting of chlorine, fluorine, and carbon.

In another embodiment, when higher weight average molecular weights (Mw) (typically greater than 10,000 Mw, preferably more than 50,000 Mw, more preferably more than 100,000 Mw) are desired, suitable diluents include hydrofluorocarbons with a dielectric constant of greater than 10 at −85° C., preferably greater than 15, more preferably greater than 20, more preferably greater than 25, more preferably 40 or more. In embodiments where lower molecular weights (typically lower than 10,000 Mw, preferably less than 5,000 Mw, more preferably less than 3,000 Mw) are desired the dielectric constant may be less than 10, or by adding larger amounts of initiator or transfer agent when the dielectric constant is above 10. The dielectric constant of the diluent ED is determined from measurements of the capacitance of a parallel-plate capacitor immersed in the diluent [measured value $C_D$], in a reference fluid of known dielectric constant $\epsilon_R$ [measured value $C_R$], and in air ($\epsilon_A$=1) [measured value $C_A$]. In each case the measured capacitance $C_M$ is given by $C_M=\epsilon C_C+C_S$, where $\epsilon$ is the dielectric constant of the fluid in which the capacitor is immersed, $C_C$ is the cell capacitance, and $C_S$ is the stray capacitance. From these measurements $\epsilon_D$ is given by the formula $\epsilon_D=((C_D-C_A) \epsilon_R+(C_R-C_D))/(C_R-C_A)$. Alternatively, a purpose-built instrument such as the Brookhaven Instrument Corporation BIC-870 may be used to measure dielectric constant of diluents directly. A comparison of the dielectric constants ($\epsilon$) of a few selected diluents at −85° C. is provided below and graphically depicted in FIG. 1.

| Diluent | $\epsilon$ at −85° C. |
| --- | --- |
| Methyl chloride | 18.34 |
| Difluoromethane | 36.29 |
| 1,1-difluoroethane | 29.33 |
| 1,1,1-trifluoroethane | 22.18 |
| 1,1,1,2-tetrafluoroethane | 23.25 |
| 1,1,2,2-tetrafluoroethane | 11.27 |
| 1,1,1,2,2-pentafluoroethane | 11.83 |

In other embodiments, one or more HFC's are used in combination with another diluent or mixtures of diluents. Suitable additional diluents include hydrocarbons, especially hexanes and heptanes, halogenated hydrocarbons, especially chlorinated hydrocarbons and the like. Specific examples include but are not limited to propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

In another embodiment, non-reactive olefins may be used as diluents in combination with HFC's. Examples include, but are not limited to, ethylene, propylene, and the like.

In one embodiment, the HFC is used in combination with a chlorinated hydrocarbon such as methyl chloride. Additional embodiments include using the HFC in combination with hexanes or methyl chloride and hexanes. In another embodiment the HFC's are used in combination with one or more gases inert to the polymerization such as carbon dioxide, nitrogen, hydrogen, argon, neon, helium, krypton, zenon, and/or other inert gases that are preferably liquid at entry to the reactor. Preferred gases include carbon dioxide and/or nitrogen.

In another embodiment the HFC's are used in combination with one or more nitrated alkanes, including $C_1$ to $C_{40}$ nitrated linear, cyclic or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

The HFC is typically present at 1 to 100 volume % based upon the total volume of the diluents, alternatively between 5 and 100 volume %, alternatively between 10 and 100 volume %, alternatively between 15 and 100 volume %, alternatively between 20 and 100 volume %, alternatively between 25 and 100 volume %, alternatively between 30 and 100 volume %, alternatively between 35 and 100 volume %, alternatively between 40 and 100 volume %, alternatively between 45 and 100 volume %, alternatively between 50 and 100 volume %, alternatively between 55 and 100 volume %, alternatively between 60 and 100 volume %, alternatively between 65 and 100 volume %, alternatively between 70 and 100 volume %, alternatively between 75 and 100 volume %, alternatively between 80 and 100 volume %, alternatively between 85 and 100 volume %, alternatively between 90 and 100 volume %, alternatively between 95 and 100 volume %, alternatively between 97 and 100 volume %, alternatively between 98 and 100 volume %, and alternatively between 99 and 100 volume %. In a preferred embodiment the HFC is blended with one or more chlorinated hydrocarbons. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another embodiment the diluent or diluent mixture is selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. The diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In a preferred embodiment, the diluent or diluent mixture is selected such that the difference between the measured glass transition temperature Tg of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC). Techniques are well described in the literature, for example, B. Wunderlich, "The Nature of the Glass Transition and its Determination by Thermal Analysis", in *Assignment of the*

*Glass Transition*, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80° C. until immediately before the DSC measurement. Preferably the Tg values are within 12° C. of each other, preferably within 11° C. of each other, preferably within 10° C. of each other, preferably within 9° C. of each other, preferably within 8° C. of each other, preferably within 7° C. of each other, preferably within 6° C. of each other, preferably within 5° C. of each other, preferably within 4° C. of each other, preferably within 3° C. of each other, preferably within 3° C. of each other, preferably within 2° C. of each other, preferably within 1° C. of each other.

Polymerization Process

The invention may be practiced in continuous and batch processes. Further the invention may be practiced in a plug flow reactor and/or stirred tank reactors. In particular this invention may be practiced in "butyl reactors." Illustrative examples include any reactor selected from the group consisting of a continuous flow stirred tank reactor, a plug flow reactor, a moving belt or drum reactor, a jet or nozzle reactor, a tubular reactor, and an autorefrigerated boiling-pool reactor.

In another aspect, heat can be removed by use of heat transfer surfaces, such as in a tubular reactor where a coolant is on one side of the tube and the polymerizing mixture is on the other side. Heat may also be removed by evaporating the polymerizing mixture, such as may be found in an autorefrigerated boiling pool type reactor. Another example, is a plug flow reactor where a portion of the polymerizing mixture is evaporated as the mixture proceeds through the reactor. Another example is where heat is removed in a plug flow reactor through surface heat transfer using coolant on the other side of a heat transfer surface. Another example would be a reactor where polymerization takes place on a moving belt or drum where the diluent/monomer/catalyst mixture is sprayed onto the belt or drum and heat is removed by evaporation of the diluent as the reaction proceeds. In addition heat may be removed in such reactors by surface heat transfer (such as where the coolant is present on the inside of the drum or under the belt and the polymer is produced on the other side of the belt or drum). Another type of reactor is a jet or nozzle reactor. These reactors have a short residence time where the monomer, diluent and catalyst system are combined in the jet or nozzle and the polymerization occurs as the mixture passes through the nozzle at high velocity.

Preferred reactors include continuous flow stirred tank reactors, whether operating in batch or continuous mode, and whether operating in a tank with an agitator or in a tube type reactor. Preferred reactors also include reactors where the polymerization occurs on one side of a heat transfer surface and the coolant is present on the other side. An example is a reactor where tubes containing coolant run inside the reactor polymerization zone. Another example would be where the polymerization occurs inside a tube and the coolant is present on the outside of the tube in a shell.

This invention may also be practiced in batch reactors where the monomers, diluent, and catalyst are charged to the reactor and then polymerization proceeds to completion (such as by quenching) and the polymer is then recovered.

In certain embodiments, the invention is practiced using a slurry polymerization process. However, other polymerization methods are contemplated such as a solution polymerization process. The polymerization processes of the invention may be cationic polymerization processes.

Figure 2:
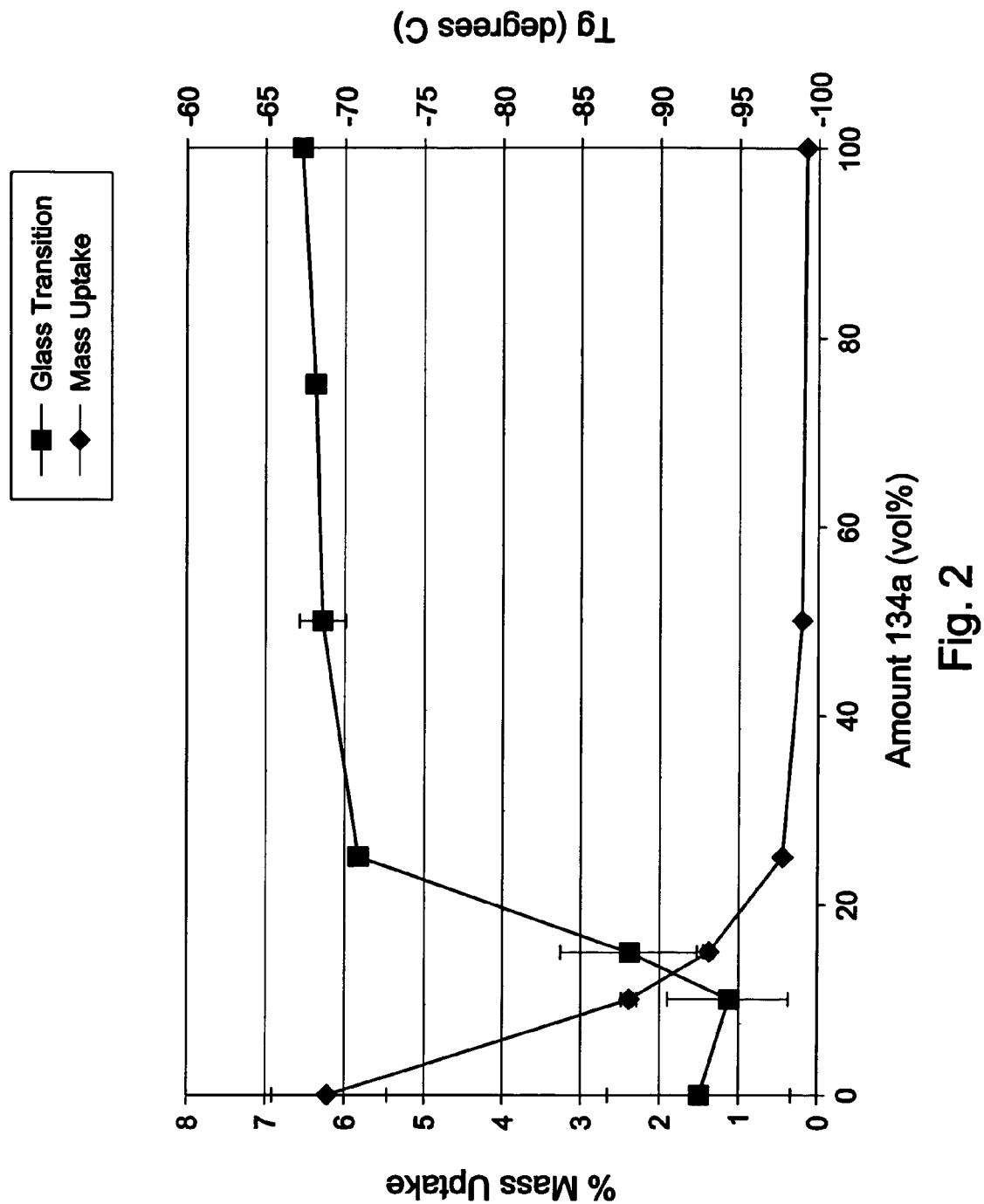
FIG. 2 is a drawing of diluent mass uptake as a function of volume fraction of hydrofluorocarbon in methyl chloride.

In one embodiment, the polymerization is carried out where the catalyst, monomer, and diluent are present in a single phase. Preferably, the polymerization is carried-out in a continuous polymerization process in which the catalyst, monomer(s), and diluent are present as a single phase. In slurry polymerization, the monomers, catalyst(s), and initiator(s) are all miscible in the diluent or diluent mixture, i.e., constitute a single phase, while the polymer precipitates from the diluent with good separation from the diluent. Desirably, reduced or no polymer "swelling" is exhibited as indicated by little or no Tg suppression of the polymer and/or little or no diluent mass uptake as shown in FIG. 2. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

The reacted monomers within the reactor form part of a slurry. In one embodiment, the concentration of the solids in the slurry is equal to or greater than 10 vol %. In another embodiment, the concentration of solids in the slurry is present in the reactor equal to or greater than 25 vol %. In yet another embodiment, the concentration of solids in the slurry is less than or equal to 75 vol %. In yet another embodiment, the concentration of solids in slurry is present in the reactor from 1 to 70 vol %. In yet another embodiment, the concentration of solids in slurry is present in the reactor from 5 to 70 vol %. In yet another embodiment, the concentration of solids in slurry concentration is present in the reactor from 10 to 70 vol %. In yet another embodiment, the concentration of solids in slurry concentration is present in the reactor from 15 to 70 vol %. In yet another embodiment, the concentration of solids in slurry concentration is present in the reactor from 20 to 70 vol %. In yet another embodiment, the concentration of solids in slurry concentration is present in the reactor from 25 to 70 vol %. In yet another embodiment, the concentration of solids in slurry concentration is present in the reactor from 30 to 70 vol %. In yet another embodiment, the concentration of solids in slurry concentration is present in the reactor from 40 to 70 vol %.

Typically, a continuous flow stirred tank-type reactor may be used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation.

The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

Other reactors that may be utilized in the practice of the present invention include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor will contain sufficient amounts of the catalyst system of the present invention effective to catalyze the polymerization of the monomer containing feed-stream such that a sufficient amount of polymer having desired characteristics is produced. The feed-stream in one embodiment contains a total monomer concentration greater than 5 wt % (based on the total weight of the monomers, diluent, and catalyst system), preferably greater than 15 wt %, greater than 30 wt % in another embodiment. In yet another embodiment, the feed-stream will contain from 5 wt % to 50 wt % monomer concentration based on the total weight of monomer, diluent, and catalyst system.

In some embodiments, the feed-stream is substantially free from silica cation producing species. By substantially free of silica cation producing species, it is meant that there is no more than 0.0005 wt % based on the total weight of the monomers of these silica cation producing species in the feed stream. Typical examples of silica cation producing species are halo-alkyl silica compounds having the formula $R_1R_2R_3SiX$ or $R_1R_2SiX_2$, etc., wherein "R" is an alkyl and "X" is a halogen. The reaction conditions will be such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, In some embodiments, the monomer feed preferably should be substantially free of bases (such as caustic), sulfur-containing compounds (such as $H_2S$, COS, and organo-mercaptans, e.g., methyl mercaptan, ethyl mercaptan), nitrogen-containing bases, oxygen containing bases such as alcohols and the like. However monomer feed may be less pure, typically not less than 95% based on total olefinic content, more preferably not less than 98%, not less than 99%. In preferred embodiments the impurities are present at less than 10,000 ppm (by weight), preferably less that 500 ppm, preferably less than 250 ppm, preferably less than 150 ppm, preferably less than 100 ppm.

As is normally the case, reaction time, temperature, concentration, the nature of the reactants, and similar factors determine product molecular weights. The polymerization reaction temperature is conveniently selected based on the target polymer molecular weight and the monomer to be polymerized as well as standard process variable and economic considerations, e.g., rate, temperature control, etc. The temperature for the polymerization is less than 0° C., preferably between −10° C. and the freezing point of the slurry in one embodiment, and from −25° C. to −120° C. in another embodiment. In yet another embodiment, the polymerization temperature is from −40° C. to −100° C., and from −70° C. to −100° C. in yet another embodiment. In yet another desirable embodiment, the temperature range is from −80° C. to −100° C. Consequently, different reaction conditions will produce products of different molecular weights. Synthesis of the desired reaction product may be achieved, therefore, through monitoring the course of the reaction by the examination of samples taken periodically during the reaction; a technique widely employed in the art.

In a preferred embodiment, the polymerization temperature is within 10° C. above the freezing point of the diluent, preferably within 8° C. above the freezing point of the diluent, preferably within 6° C. above the freezing point of the diluent, preferably within 4° C. above the freezing point of the diluent, preferably within 2° C. above the freezing point of the diluent, preferably within 1° C. above the freezing point of the diluent. For the purposes of this invention and the claims thereto when the phrase "within X° C. above the freezing point of the diluent" is used it means the freezing point of the diluent plus X° C. For example if the freezing point of the diluent is −98° C., then 110° C. above the freezing point of the diluent is −88° C.

The reaction pressure will be from above 0 to 14,000 kPa in one embodiment (where 0 kPa is a total vacuum), from 7 kPa to 12,000 kPa in another embodiment, from 100 kPa to 2000 kPa in another embodiment, from 200 kPa to 1500 kPa in another embodiment, from 200 kPa to 1200 kPa in another embodiment, and from 200 kPa to 1000 kPa in yet another embodiment, from 7 kPa to 100 kPa in another embodiment, from 20 kPa to 70 kPa in another embodiment, from 40 kPa to 60 kPa in yet another embodiment, from 1000 kPa to 14,000 kPa in another embodiment, from 3000 kPa to 10,000 kPa in another embodiment, and from 3,000 kPa to 6,000 kPa in yet another embodiment.

The order of contacting the monomer feed-stream, catalyst, initiator, and diluent may vary from one embodiment to another.

In another embodiment, the initiator and Lewis acid are pre-contacted by mixing together in the selected diluent for a prescribed amount of time ranging from 0.01 second to 10 hours, and then is injected into the continuous reactor through a catalyst nozzle or injection apparatus. In yet another embodiment, Lewis acid and the initiator are added to the reactor separately. In another embodiment, the initiator is blended with the feed monomers before injection to the reactor. Desirably, the monomer is not contacted with the Lewis acid, or the Lewis acid combined with the initiator before the monomers enter the reactor.

In an embodiment of the invention, the initiator and Lewis acid are allowed to pre-contact by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In another embodiment of the invention, the initiator and Lewis acid are allowed to pre-contact by mixing together in the selected diluent at temperatures between 80 and −150° C., typically between −40° C. and −98° C.

The overall residence time in the reactor can vary, depending upon, e.g., catalyst activity and concentration, monomer concentration, feed injection rate, production rate, reaction temperature, and desired molecular weight, and generally will be between about a few seconds and five hours, and typically between about 10 and 60 minutes. Variables influencing residence time include the monomer and diluent feed injection rates and the overall reactor volume.

The catalyst (Lewis acid) to monomer ratio utilized will be those conventional in this art for carbocationic polymerization processes. In one embodiment of the invention, the monomer to catalyst mole ratios will typically be from 500 to 10000, and in the range of 2000 to 6500 in another embodiment. In yet another desirable embodiment, the ratio of Lewis acid to initiator is from 0.5 to 10, or from 0.75 to 8. The overall concentration of the initiator in the reactor is typically from 5 to 300 ppm or 10 to 250 ppm. The concentration of the initiator in the catalyst feed stream is typically from 50 to 3000 ppm in one embodiment. Another way to describe the amount of initiator in the reactor is by its amount relative to the polymer. In one embodiment, there is from 0.25 to 20 moles polymer/mole initiator, and from 0.5 to 12 mole polymer/mole initiator in another embodiment.

The reactor will contain sufficient amounts of the catalyst system of the present invention to catalyze the polymerization of the monomer containing feed-stream such that a sufficient amount of polymer having desired characteristics is produced. The feed-stream in one embodiment contains a total monomer concentration greater than 20 wt % (based on the total weight of the monomers, diluent, and catalyst system), greater than 25 wt % in another embodiment. In yet another embodiment, the feed-stream will contain from 30 wt % to 50 wt % monomer concentration based on the total weight of monomer, diluent, and catalyst system.

Catalyst efficiency (based on Lewis acid) in the reactor is maintained between 10,000 pounds of polymer per pound of catalyst and 300 pounds of polymer per pound of catalyst and desirably in the range of 4000 pounds of polymer per pound of catalyst to 1000 pounds of polymer per pound of catalyst by controlling the molar ratio of Lewis acid to initiator.

In one embodiment, the polymerization of cationically polymerizable monomers (such as polymerization of isobutylene and isoprene to form butyl rubber) comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst system and unreacted monomers through the reaction tubes. A feed-stream of the cationically polymerizable monomer(s) (such as isoprene and isobutylene) in a polar diluent is charged into the reactor, the feed-stream containing less than 0.0005 wt % of cation producing silica compounds, and typically free of aromatic monomers. The catalyst system is then charged into the reactor, the catalyst system having a Lewis acid and an initiator present in a molar ratio of from 0.50 to 10.0. Within the reactor, the feed-stream of monomers and catalyst system are allowed to contact one another, the reaction thus forming a slurry of polymer (such as butyl rubber), wherein the solids in the slurry has a concentration of from 20 vol % to 50 vol %. Finally, the thus formed polymer (such as butyl rubber) is allowed to exit the reactor through an outlet or outflow line while simultaneously allowing the feed-stream charging to continue, thus constituting the continuous slurry polymerization. Advantageously, the present invention improves this process in a number of ways, e.g., by ultimately reducing the amount of polymer accumulation on the reactor walls, heat transfer surfaces, agitators and/or impeller(s), and in the outflow line or exit port, as measured by pressure inconsistencies or "jumps."

In one embodiment, the resultant polymer from one embodiment of the invention is a polyisobutylene/isoprene polymer (butyl rubber) that has a molecular weight distribution of from about 2 to 5, and an unsaturation of from 0.5 to 2.5 mole per 100 mole of monomer. This product may be subjected to subsequent halogenation to afford a halogenated butyl rubber.

INDUSTRIAL APPLICATIONS

The polymers of the invention provide chemical and physical characteristics that make them highly useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of the invention make them ideal for rubber tire-curing bladders, high temperature service hoses, and conveyor belts for hot material handling.

The polymers exhibit high damping and have uniquely broad damping and shock absorption ranges in both temperature and frequency. They are useful in molded rubber parts and find wide applications in automobile suspension bumpers, auto exhaust hangers, and body mounts.

The polymers of the instant invention are also useful in tire sidewalls and tread compounds. In sidewalls, the polymer characteristics impart good ozone resistance, crack cut growth, and appearance. The polymers of the invention may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant invention.

Blends of the polymers of the invention with thermoplastic resins are used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers of the instant invention may also be blended with polyamides to produce other industrial applications.

The polymers of the instant invention may also be used as adhesives, caulks, sealants, and glazing compounds. They are also useful as plasticizers in rubber formulations with butyl, SBR, and natural rubber. In linear low density polyethylene (LLDPE) blends, they induce cling to stretch-wrap films. They are also widely employed in lubricants as dispersants and in potting and electrical cable filling materials.

In certain applications, the polymers of the invention make them also useful in chewing-gum, as well as in medical applications such as pharmaceutical stoppers, and the arts for paint rollers.

The following examples reflect embodiments of the invention and are by no means intended to be limiting of the scope of the invention.

EXAMPLES

The polymerizations were performed glass reaction vessels, equipped with a teflon turbine impeller on a glass stir shaft driven by an external electrically driven stirrer. The size and design of the glass vessels is noted for each set of examples. The head of the reactor included ports for the stir shaft, thermocouple and addition of initiator/coinitiator solutions. The reactor was cooled to the desired reaction temperature, listed in the Tables, by immersing the assembled reactor into a pentane or isohexane bath in the dry box. The temperature of the stirred hydrocarbon bath was controlled to ±2° C. All apparatus in liquid contact with the reaction medium were dried at 120° C. and cooled in a nitrogen atmosphere before use. Isobutylene (Matheson or ExxonMobil) and methyl chloride (Air Products) were dried by passing the gas through three stainless steel columns containing barium oxide and were condensed and collected as liquids in the dry box. Alternatively, methyl chloride was dried by passing the gas through stainless steel columns containing silica gel and molecular sieves. Both materials were condensed and collected as liquids in the dry box. Isoprene (Aldrich) was dried over calcium hydride and distilled under Argon. p-Methylstyrene (Aldrich) was dried over calcium hydride and distilled under vacuum. TMPCl (2-chloro-2,4,4,-trimethylpentane) was prepared from 2,4,4-trimethylpentene-1 and a 2.0 mol/L solution of HCl in diethyl ether. The TMPCl was distilled before use. The HCl (Aldrich, 99% pure) stock solution was prepared by dissolving a desirable amount of HCl gas in dry MeCl to achieve 2-3% concentration by weight. The hydrofluorocarbons that were collected as clear, colorless liquids at −95° C. were used as received. Hydrofluorocarbons that remained cloudy or had visible insoluble precipitates at −95° C. were distilled before use. Propane (Aldrich), used as received, was condensed and used as a liquid. Alkylaluminum dichlorides (Aldrich) were used as hydrocarbon solutions. These solutions were either purchased or prepared from the neat alkylaluminum dichloride.

The slurry copolymerizations were performed by dissolving monomer and comonomer into the liquefied hydrofluorocarbon at polymerization temperature and stirred at a predetermined stirring speed between 800 to 1000 rpm. The use of a processor controlled electric stirring motor allowed control of the stirring speed to within 5 rpm. The initiator/coinitiator solutions were prepared either in the hydrofluorocarbon or, for convenience of small-scale experiments, in a small volume of methyl chloride. The initiator/coinitiator solutions were prepared by dissolving the initiator into the diluent (specified in each of the examples) and adding, with mixing, a 1.0 M solution of the alkylaluminum halide. The initiator/coinitiator solution was used immediately. The initiator/coinitiator solution was added dropwise to the polymerization using a chilled glass Pasteur pipette or, optionally, a jacketed dropping funnel for examples using the 500 ml glass reaction vessels. When a second or third initiator/coinitiator addition is specified in the examples, we refer to the preparation and addition of a second or third batch of freshly prepared initiator/coinitiator solution identical in volume and concentrations to the first batch. The physical behavior of the rubber particles and the state of fouling was determined at the end of the addition of each catalyst batch by stopping and removing the stir shaft and probing the particles with a chilled spatula. Stirring was begun again and the reaction quenched with the addition of greater than 100 microliters of methanol. Conversion is reported as weight percent of the monomers converted to polymer.

Polymer molecular weights were determined by SEC (Size Exclusion Chromatography) using a Waters Alliance 2690 separations module equipped with column heaters and a Waters 410 differential refractometer detector. Tetrahydrofuran was used as eluent (1 ml/min., 35° C.) with a set of Waters Styragel HR 5µ columns of 500, 1000, 2000, $10^4$, $10^5$ and $10^6$ Å pore size. A calibration based on narrow molecular weight polyisobutylene standards (American Polymer Standards) was used to calculate molecular weights and distributions.

Polymer molecular weights can be determined on other SEC instruments using different calibration and run protocols. The methodlgy of SEC (also know as GPC or gel permeation chromatography) to characterize polymer molecular weights has been reviewed in many publications. One such source is the review provided by L. H. Tung in *Polymer Yearbook*, H.-G. Elias and R. A. Pethrick, Eds., Harwood Academic Publishers, New York, 1984, pgs. 93-100, herein incorporated by reference.

Comonomer incorporation was determined by $^1$H-NMR spectrometry. NMR measurements were obtained at a field strength corresponding to 400 MHz or 500 MHz. $^1$H-NMR spectra were recorded at room temperature on a Bruker Avance NMR spectrometer system using $CDCl_3$ solutions of the polymers. All chemical shifts were referenced to TMS.

Triad sequence distributions were obtained from $^{13}$C NMR spectrometry using a Varian Unity spectrometer at a field strength of 125.7 MHz and a temperature of 50° C. Polymer samples were dissolved into $CDCl_3$ (containing 1.5% wt./v. of chromium (III) acetylacetonate as a relaxation agent) at a concentration of 6 to 8 wt. %. The free induction decays were collected with a 90° pulse, 3.0 second recycle delay and a 2.133 second acquisition time. Each data set consisted of a sweep width of 30,007 Hz and 30,000 scans/transients. All chemical shifts were referenced to tetramethylsilane.

Data processing was performed with the NutsPro NMR Utility Transform Software from Acorn NMR, Inc. (Livermore, Calif.). The carbon-13 free induction decays were Fourier transformed with 65K points and 1 Hz line broadening, and the resulting spectra were phased and baseline corrected. The areas of the olefinic resonances were measured by peak deconvolution, rather than manual integration, in order to optimize measurement accuracy. A peak profile of 85% Lorentzian and 15% Gaussian character was assumed for the calculation. Linewidth, height, and position were varied to obtain the fit.

The isoprene triad resonances were assigned according to information reported by C. Corno, A. Proni, A. Priola, and S. Cesca in *Macromolecules* 1980, 13, 1092 and J. L. White, T. D. Shaffer, C. J. Ruff, and J. P. Cross in Macromolecules 1995, 28, 3290, both herein incorporated by reference. For each triad structure, a quaternary carbon and a tertiary carbon resonance was observed. The BII (B=isobutylene, I=isoprene) olefin triad fractions were calculated for each type of carbon, quaternary and tertiary. For example, the BII value for tertiary carbons was calculated by dividing the average of the BII tertiary carbon integral and the IIB tertiary carbon integral by the sum of all the tertiary integrals for BIB, BII, IIB, and III triads. By definition, the BII triad fraction must equal the IIB triad fraction. Once BII triad fractions were calculated for each carbon type, tertiary and quaternary, these values were averaged and used for comparison with the amount of isoprene incorporated into the copolymer. A plot of the BII fraction (expressed as a percentage of all isoprene centered triads e.g. 100×BII fraction) versus mol % isoprene incorporated into the copolymer was created and is described below.

For the purposes of this invention, the relationship between the BII triad fraction and the mol % isoprene incorporated into the copolymer is described by the copolymer sequence distribution equation described below and is characterized by the copolymer sequence distribution parameter, m.

$$F_{BII}=mA/(1+mA)^2$$

where: m is the copolymer sequence distribution parameter,

A is the molar ratio of isoprene to isobutylene in the copolymer, [IP]/[IB] and, $F_{BII}$ is the BII triad fraction in the copolymer.

The data obtained by $^{13}$C NMR spectrometry was fit by iterative solution to the copolymer sequence distribution equation.

A variety of NMR methods have been used to characterize comonomer incorporation and sequence distribution in copolymers. Many of these methods may be applicable to the polymers of this invention. A general reference which reviews the application of NMR spectrometry to the characterization of polymers is H. R. Kricheldorf in *Polymer Yearbook*, H.-G.

Elias and R. A. Pethrick, Eds., Harwood Academic Publishers, New York, 1984, pgs. 249-257, herein incorporated by reference.

Table 1 lists the results of polymerizations conducted at −90 to −95° C. in hydrofluorocarbons and methyl chloride ($CH_3Cl$) (Example 10) and propane (Example 11) for comparison. A 100 ml glass mini-resin kettle was used for these examples. TMPCl (2-chloro-2,4,4-trimethylpentane) was used as an initiator in these examples.

The polymerization in difluoromethane gave rubber particles that exhibited stiff-rubbery physical properties as evidenced by probing with a chilled spatula at reaction temperature. Minor amounts of fouling were evident on the reactor walls and stirring shaft. In comparison, the polymerization in methyl chloride resulted in a viscous coating of polymer on both the reactor walls and the stirring shaft. Very little of the polymer was "suspended" in the diluent medium. The pro- TABLE 1[a]

| Example | Temp. (° C.) | Diluent | Yield (g) | Conversion (Wt. %) | $M_w \times 10^{-3}$ | $M_w/M_n$ | Mol % IP |
|---|---|---|---|---|---|---|---|
| 1[b] | −95 | $CH_3F$ | 0.80 | 21.1 | 225 | 2.4 | 1.2 |
| 2[c,d] | −93 | $CH_2F_2$ | 3.28 | 83 | 305 | 3.1 | 1.7 |
| 3 | −90 | $CH_2F_2$ | 0.99 | 24.8 | 297 | 3.4 | 1.5 |
| 4 | −95 | $CHF_3$ | 1.88 | 47.1 | 390 | 4.6 | 2.2 |
| 5[c] | −95 | $CH_3CHF_2$ | 1.48 | 37.3 | 842 | 2.5 | 1.4 |
| 6[c,d] | −95 | $CH_3CF_3$ | 2.89 | 72.1 | 327 | 2.3 | 2.0 |
| 7[c] | −95 | $CH_2FCF_3$ | 1.48 | 37.3 | 384 | 2.5 | 1.7 |
| 8[c] | −95 | $CHF_2CHF_2$ | 0.82 | 41.0 | 142 | 2.3 | 2.3 |
| 9[c,e] | −95 | $CHF_2CF_3$ | 0.39 | 29.3 | 106 | 2.8 | 2.6 |
| 10 | −90 | $CH_3Cl$ | 0.58 | 14.5 | 397 | 3.3 | 1.3 |
| 11 | −95 | Propane | 2.37[c] | 59.4 | 67 | 2.4 | 2.0 |

[a] Except where noted polymerizations were run with 30 ml of diluent, 5.4 ml of isobutylene and 0.23 ml of isoprene (IP), initiator/coinitiator solutions were prepared in 1.3 ml of methyl chloride using 1.6 microliters of TMPCl and 11.5 microliters of a 1.0 M hexane solution of methylaluminum dichloride (MADC).
[b] Three initiator/coinitiator batches added to the reactor
[c] Two initiator/coinitiator batches added to the reactor
[d] ethylaluminum chloride (EADC) used in place of MADC
[e] reaction scaled to 10 ml of diluent Polymerization in any of the hydrofluorocarbons resulted in rubber particles that did not adhere to the walls of the reactor or to the stirring shaft. The particles floated to the surface of the liquid when stirring stopped. The particles were hard as evidenced by pressing on them with a chilled spatula when tested near reaction temperature. Polymerization in methyl chloride resulted in rubber particles that adhered to both the reactor walls and the stirring shaft. The particles were clearly rubbery when probed with a chilled spatula when tested near reaction temperature. Polymerization in propane resulted in a two-phase liquid-liquid reaction. The denser phase was clearly rich in polymer where as the lighter phase was rich in propane.

pane based polymerization experiment did not look appreciably different than the run at −95° C. (Table 1, Example 11). Two phases were apparent in the reactor. The denser phase was rich in polymer and the lighter phase rich in propane. The polymer in the presence of the propane diluent was considerably less viscous than the polymer formed in the methyl chloride run.

Examples 15-21

Table 3 lists the results of polymerizations conducted at −95° C. in hydrofluorocarbon/methyl chloride blends. A 100 ml glass mini-resin kettle was used for these examples. TMPCl (2-chloro-2,4,4-trimethylpentane) was used as an initiator in these examples.

Examples 12-14

Results for polymerizations conducted at −50 to −55° C. are given in Table 2. Examples 13 and 14 are comparative examples. A 100 ml glass mini-resin kettle was used for these examples. TMPCl (2-chloro-2,4,4-trimethylpentane) was used as an initiator in these examples.

TABLE 2[a]

| Example | Temp. (C.) | Diluent | Yield (g) | Conversion (Wt. %) | $M_w \times 10^{-3}$ | $M_w/M_n$ | Mol % IP |
|---|---|---|---|---|---|---|---|
| 12 | −55 | $CH_2F_2$[b] | 1.1 | 29.0 | 205 | 2.2 | 1.9 |
| 13 | −50 | $CH_3Cl$ | 1.1 | 29.0 | 52 | 1.5 | 1.1 |
| 14 | −55 | Propane[b] | 1.2 | 30.9 | 87 | 2.2 | 1.8 |

[a] Polymerizations were run with 30 ml of diluent, 5.4 ml of isobutylene and 0.23 ml of isoprene (IP), initiator/coinitiator solutions were prepared in 1.3 ml of methyl chloride using 1.6 microliters of TMPCl and 11.5 microliters of a 1.0 M hexane solution of methylaluminum dichloride
[b] Two initiator/coinitiator batches added to the reactor

TABLE 3[a]

| Example | Diluents | Vol % | Yield (g) | Conversion (Wt. %) | $M_w \times 10^{-3}$ | $M_w/M_n$ | Mol % IP |
|---|---|---|---|---|---|---|---|
| 15 | $CH_3Cl/CH_2FCF_3$ | 95/5 | 2.97 | 74.0 | 234 | 3.5 | 1.2 |
| 16 | $CH_3Cl/CH_2FCF_3$ | 90/10 | 1.90 | 47.0 | 600 | 2.9 | 1.6 |
| 17 | $CH_3Cl/CH_2FCF_3$ | 85/15 | 2.58 | 64.0 | 435 | 2.5 | 1.3 |
| 18 | $CH_3Cl/CH_2FCF_3$ | 85/15 | 1.83 | 46.0 | 570 | 2.5 | 1.7 |
| 19 | $CH_3Cl/CH_2FCF_3$ | 80/20 | 1.85 | 46.6 | 285 | 2.7 | 1.5 |
| 20 | $CH_3Cl/CH_2F_2$ | 80/20 | 3.22 | 80.0 | 312 | 3.2 | 1.9 |
| 21 | $CH_3Cl/CH_3CF_3$ | 80/20 | 2.83 | 70.6 | 179 | 2.7 | 2.2 |

[a]Except where noted polymerizations were run with 30 ml of diluent, 5.4 ml of isobutylene and 0.23 ml of isoprene (IP), initiator/coinitiator solutions were prepared in 2.6 ml of methyl chloride using 3.2 microliters of TMPCl and 23.0 microliters of a 1.0 M hexane solution of ethylaluminum dichloride (EADC)
[b]methylaluminum dichloride (MADC) used instead of ethylaluminum dichloride (EADC)

Examples 22-25

Results for polymerizations conducted at −55° C. are given in Table 4. Two batches of initiator/coinitiator solutions were used for each example. A 100 ml glass mini-resin kettle was used for these examples. TMPCl (2-chloro-2,4,4,-trimethylpentane) was used as an initiator in these examples.

TABLE 4[a]

| Example | Diluents | Vol % | Yield (g) | Conversion (Wt. %) | $M_w \times 10^{-3}$ | $M_w/M_n$ | Mol % IP |
|---|---|---|---|---|---|---|---|
| 22 | $CH_3Cl/CH_2FCF_3$ | 90/10 | 2.35 | 61.7 | 84 | 1.7 | 2.2 |
| 23 | $CH_3Cl/CH_2FCF_3$ | 85/15 | 2.96 | 77.7 | 77 | 2.2 | 2.2 |
| 24 | $CH_3Cl/CH_2FCF_3$ | 80/20 | 2.37 | 62.2 | 82 | 1.9 | 2.0 |
| 25 | $CH_3Cl/CH_2FCF_3$ | 75/25 | 2.38 | 62.5 | 88 | 2.0 | 2.2 |

[a]Polymerizations were run with 30 ml of diluent, 5.4 ml of isobutylene and 0.23 ml of isoprene (IP), initiator/coinitiator solutions were prepared in 1.3 ml of methyl chloride using 1.6 microliters of TMPCl and 11.5 microliters of a 1.0 M hexane solution of methylaluminum dichloride (MADC).

Example 26

A polymerization was conducted with methoxyaluminum dichloride at −95° C. The initiator/coinitiator solution was prepared by dissolving 0.93 microliters of anhydrous methanol into 2.6 ml of liquid 1,1,1,2-tetrafluoroethane at −35° C. To this solution was added 23 microliters of a 1.0 mol/L solution of ethylaluminum dichloride in pentane. This solution was stirred for 10 minutes. A second solution was prepared in the same way. To each solution, 3.2 microliters of 2-chloro-2,4,4-trimethylpentane was added with stirring and cooled −95° C. Both solutions were added dropwise to the polymerization solution with a chilled pipette. A 100 ml glass mini-resin kettle was used for this example.

TABLE 5

| Example | Diluent | Yield (g) | Conversion (Wt. %) | $M_w \times 10^{-3}$ | $M_w/M_n$ | Mol % IP |
|---|---|---|---|---|---|---|
| 26 | $CH_2FCF_3$ | 2.61 | 65 | 248 | 2.6 | 2.6 |

Example 27

Table 6 lists the results of a polymerization conducted at −95° C. conducted in an 85/15 (V/V) blend of 1,1,1,2-tetrafluoroethane and 1,1-difluoroethane. This run was made with 30 ml of diluent, 5.4 ml of isobutylene, 0.26 ml of isoprene and used a initiator/coinitiator solution prepared in 2.6 ml methyl chloride using 3.2 microliters of TMPCl and 32.0 microliters of a 1.0 M hexane solution of methylaluminum dichloride (MADC). A 100 ml glass mini-resin kettle was used for this example.

TABLE 6

| Example | Yield (g) | Conversion (Wt. %) | $M_w \times 10^{-3}$ | $M_w/M_n$ | Mol % IP |
|---|---|---|---|---|---|
| 27 | 0.28 | 7 | 772 | 2.8 | 1.8 |

Examples 28-31

Table 7 lists the results of polymerizations that were conducted at −95° C. in hydrofluorocarbons and a blend of a hydrofluorocarbon and methyl chloride using p-methylstyrene (pMS) as a comonomer. A 100 ml glass mini-resin kettle was used for these examples. TMPCl (2-chloro-2,4,4-trimethylpentane) was used as an initiator in these examples.

TABLE 7[a]

| Example | Diluent | Yield (g) | Conversion (Wt. %) | $M_w \times 10^{-3}$ | $M_w/M_n$ | Mol % pMS |
|---|---|---|---|---|---|---|
| 28 | $CH_2FCF_3$ | 1.37 | 33 | 322 | 3.2 | 2.1 |
| 29 | $CH_3Cl/CH_2FCF_3$ 80/20 V/V | 0.96 | 23 | 762 | 4.2 | 2.2 |
| 30[b] | $CH_2FCF_3$ | 3.81 | 92 | 160 | 3.3 | 3.6 |
| 31[b,c] | $CH_2FCF_3$ | 1.18 | 28 | 278 | 3.2 | 1.8 |

[a] Except where noted polymerizations were run with 30 ml of diluent, 5.4 ml of isobutylene and 0.34 ml of p-methylstyrene, initiator/coinitiator solutions were prepared in 2.6 ml of methyl chloride using 3.2 microliters of TMPCl and 23.0 microliters of a 1.0 M hexane solution of ethylaluminum dichloride (EADC).
[b] 32.0 microliters of a 1.0 M hexane solution of ethylaluminum dichloride was used instead of the amount noted in (a) above.
[c] 1.6 microliters of 2-chloro-2-methylpropane used in place of the TMPCl used in (a).

Polymerization in any of the diluents of Table 7 resulted in rubber particles that did not adhere to the walls of the reactor or to the stirring shaft. The particles floated to the surface of the liquid when stirring stopped. When tested near the reaction temperature, the particles were hard as evidenced by pressing on them with a chilled spatula.

Examples 32-37

Table 8 lists the results of polymerizations that were conducted at −95° C. in hydrofluorocarbons and methyl chloride for comparison. Examples 36 and 37 are comparative examples. A three-neck 500 ml glass reactor was used for these examples. Prior to each polymerization, 300 ml of monomer feed containing 10 wt % of monomers were charged into the chilled reactor. The initiator/coinitiator molar ratio was controlled at 1/3 and the concentration was set at 0.1 wt % EADC in MeCl. The initiator/coinitiator solution was added dropwise to the polymerization mixture and the rate of addition is controlled in such as way so that the reactor temperature raise did not exceed 4° C. The amount of initiator/coinitiator solution added in each depended on the desired monomer conversion target.

TABLE 8[a]

| Example | Diluent | Conversion (Wt. %) | $M_n \times 10^{-3}$ | $M_w \times 10^{-3}$ | $M_w/M_n$ | Mol % IP |
|---|---|---|---|---|---|---|
| 32 | $CH_2FCF_3$ | 65 | 315 | 626 | 2.0 | 2.7 |
| 33 | $CH_2FCF_3$ | 94 | 213 | 489 | 2.3 | 3.0 |
| 34 | $CH_3CHF_2$ | 55 | 414 | 813 | 2.0 | 1.3 |
| 35 | $CH_3CHF_2$ | 100 | 197 | 558 | 2.8 | 1.8 |
| 36 | $CH_3Cl$ | 54 | 170 | 628 | 3.7 | 2.0 |
| 37 | $CH_3Cl$ | 97 | 135 | 517 | 3.8 | 2.4 |

[a] Polymerizations were run with an isobutylene/isoprene molar feed ratio of 95/5

The examples in Table 8 demonstrate the production of high molecular weight butyl rubber using an EADC/HCl initiator system in $CHF_2CF_3$ and $CH_2CHF_2$ diluents. The molecular weight of the butyl polymers made in $CHF_2CF_3$ and $CH_3CHF_2$ were significantly higher than polymers made in MeCl at similar monomer conversion under similar conditions. The polydispersity (Mw/Mn) of the butyl polymers made in both $CH_2FCF_3$ and $CH_3CHF_2$ was narrower and closer to the most probable polydispersity of 2.0 than the polymers made in MeCl under similar experimental conditions. The isoprene incorporation in the copolymers made in MeCl falls between $CH_2FCF_3$ and $CH_3CHF_2$. The polymer slurry particles made in both $CH_2FCF_3$ and $CH_3CHF_2$ appeared to be significantly less sticky during handling than the polymer slurry particles made in MeCl under similar conditions.

Examples 38-44

Table 9 lists the results of copolymerizations of isobutylene and p-methylstyrene that were conducted at −95° C. in hydrofluorocarbons and methyl chloride for comparison. Examples 41 and 42 are comparative examples. A three-neck 500 ml glass reactor was used for these examples. Prior to each polymerization, 300 ml of monomer feed containing 10 wt % of monomers were charged into the chilled reactor. The initiator/coinitiator molar ratio was controlled at 1/3 and the concentration was set at 0.1 wt % EADC in MeCl. The initiator/coinitiator solution was added dropwise to the polymerization mixture and the rate of addition is controlled in such as way so that the reactor temperature raise did not exceed 4° C. The amount of initiator/coinitiator solution added in each depended on the desired monomer conversion target.

TABLE 9[a]

| Example | Diluent | Conversion (Wt. %) | $M_n \times 10^{-3}$ | $M_w \times 10^{-3}$ | $M_w/M_n$ | Mole % pMS |
|---|---|---|---|---|---|---|
| 38 | $CHF_2CF_3$ | 22 | 91 | 298 | 3.3 | 4.3 |
| 39 | $CHF_2CF_3$ | 57 | 89 | 291 | 3.3 | 4.4 |
| 40 | $CHF_2CF_3$ | 98 | 74 | 244 | 3.3 | 4.6 |
| 41 | $CH_3CHF_2$ | 56 | 188 | 1,091 | 5.8 | 4.1 |
| 42 | $CH_3CHF_2$ | 100 | 169 | 908 | 5.4 | 4.9 |
| 43 | $CH_3Cl$ | 57 | 97 | 443 | 4.6 | 3.8 |
| 44 | $CH_3Cl$ | 69 | 94 | 342 | 3.6 | 4.0 |

[a] Polymerizations were run with an isobutylene/p-methylstyrene molar feed ratio of 90/10

The examples in Table 9 demonstrate that using an EADC/HCl initiator system in a $CH_2FCF_3$ diluent, the production of isobutylene-PMS copolymers with comparable molecular weights to copolymers produced in a MeCl diluent. Isobutylene/p-methylstyrene copolymers prepared in $CH_3CHF_2$ exhibit much higher molecular weights. The pMS incorporation in the copolymer is significantly higher in $CH_2FCF_3$ than in MeCl using the same monomer feed composition under similar reaction conditions. In addition, the polymer slurry particles in $CH_2FCF_3$ appears to be significantly less sticky in $CH_2FCF_3$ than in MeCl.

Examples 45-47

Table 10 lists the results of copolymerizations of isobutylene/p-methylstyrene and isobutylene/isoprene that were conducted at −95° C. in an 80/20 mixture (by volume) of $CH_2FCF_3$ and $CH_3CHF_2$. A three-neck 500 ml glass reactor was used for these examples. Prior to each polymerization, 300 ml of monomer feed containing 10 wt % of monomers were charged into the chilled reactor. The initiator/coinitiator molar ratio was controlled at 1/3 and the concentration was set at 0.1 wt % EADC in MeCl. The initiator/coinitiator solution was added dropwise to the polymerization mixture and the rate of addition is controlled in such as way so that the reactor temperature raise did not exceed 4° C. The amount of initiator/coinitiator solution added in each depended on the desired monomer conversion target.

TABLE 10

| Example | Comonomer | Conversion (Wt. %) | $M_n \times 10^{-3}$ | $M_w \times 10^{-3}$ | $M_w/M_n$ |
|---|---|---|---|---|---|
| 45[a] | Isoprene | 87 | 309 | 676 | 2.2 |
| 46[b] | pMS | 76 | 449 | 1,048 | 2.3 |
| 47[b] | pMS | 100 | 349 | 1,166 | 3.3 |

[a]Polymerizations were run with an isobutylene/isoprene molar feed ratio of 95/5
[b]Polymerizations were run with an isobutylene/p-methylstyrene molar feed ratio of 90/10

Table 10 demonstrates the production of high molecular weight isobutylene-isoprene copolymers and isobutylene-pMS copolymers using an EADC/HCl initiator system in a mixture of $CH_2FCF_3$ and $CH_3CHF_2$ as the polymerization diluent. The polymer slurry particles in the $CH_2FCF_3/C_3CHF_2$ mixture demonstrate the same non-stickiness appearance as in a pure $CH_2FCF_3$ or $CH_3CHF_2$ diluent described above.

Examples 48-117

Examples 48-117 exemplify copolymerization of isobutylene with other comonomers. The copolymerizations have been run at two temperatures and in four diluents.

The polymerization examples listed in Tables 11-16 were obtained by running slurry copolymerizations in test tubes equipped with rare earth magnetic stir bars. Monomer solutions were prepared in the test tubes at the desired temperature, which is identified in the paragraphs below, by combining 20 ml of the liquid diluent, 5 ml of liquid isobutylene and enough liquid comonomer to achieve a 3 mol % comonomer feed. Polymerization solutions were magnetically stirred at the identified temperature and were initiated by the dropwise addition of a stock coinitiator/initiator solution using a chilled glass Pasteur pipette. Conversion is reported as weight percent of the monomers converted to polymer.

Table 11 lists the results of polymerizations that were conducted at −95° C. either in methyl chloride (as a comparative, examples 48, 49, 50, 57, 58, 59, 66, 67, and 68), 1,1,1,2-tetrafluoroethane or 1,1-difluoroethane. Isobutylene was copolymerized with either p-t-butylstyrene (t-BuS) (0.36 ml per run), indene (Ind) (0.23 ml per run) or β-pinene (βP) (0.31 ml per run) as indicated in Table 18. A stock solution of ethylaluminum dichloride (EADC) and hydrogen chloride (HCl) was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. Polymerizations were run by adding, dropwise, 1.5 ml of this stock EADC/HCl solution to the stirred monomer solutions. Polymerizations were terminated with the addition of 0.2 ml of methanol. Polymerization in any of the hydrofluorocarbons resulted in rubber particles that did not adhere to the walls of the reactor or to the stirring bar. The particles floated to the surface of the liquid when stirring stopped. The particles were hard as evidenced by pressing on them with a chilled spatula when tested near reaction temperature. Polymerization in methyl chloride resulted in rubber particles that adhered to both the reactor walls and the stirring shaft.

TABLE 11

| Example | Diluent | CoM | Yield (mg) | Conv. (wt. %) | $M_w \times 10^{-3}$ | Mw/Mn | mol % CoM |
|---|---|---|---|---|---|---|---|
| 48 | $CH_3Cl$ | t-BuS | 496 | 12.8 | 139 | 2.5 | 1.4 |
| 49 | $CH_3Cl$ | t-BuS | 384 | 9.6 | 130 | 2.3 | 2.4 |
| 50 | $CH_3Cl$ | t-BuS | 485 | 12.6 | 112 | 2.2 | 1.5 |
| 51 | $CH_2FCF_3$ | t-BuS | 345 | 8.9 | 128 | 2.0 | 2.0 |
| 52 | $CH_2FCF_3$ | t-BuS | 249 | 6.4 | 128 | 2.0 | 1.6 |
| 53 | $CH_2FCF_3$ | t-BuS | 295 | 7.6 | 119 | 1.9 | 1.9 |
| 54 | $CH_3CHF_2$ | t-BuS | 325 | 8.4 | 297 | 2.7 | 1.8 |
| 55 | $CH_3CHF_2$ | t-BuS | 433 | 11.2 | 217 | 2.6 | 2.3 |
| 56 | $CH_3CHF_2$ | t-BuS | 333 | 8.6 | 303 | 2.7 | 1.8 |
| 57 | $CH_3Cl$ | Ind | 375 | 9.9 | 68 | 2.2 | 1.2 |
| 58 | $CH_3Cl$ | Ind | 179 | 4.7 | 117 | 1.7 | 1.3 |
| 59 | $CH_3Cl$ | Ind | 130 | 3.4 | 103 | 2.3 | 1.1 |
| 60 | $CH_2FCF_3$ | Ind | 2279 | 60.8 | 131 | 2.2 | 2.3 |
| 61 | $CH_2FCF_3$ | Ind | 1199 | 31.9 | 101 | 2.1 | 2.4 |
| 62 | $CH_2FCF_3$ | Ind | 2299 | 61.3 | 116 | 2.2 | 2.0 |
| 63 | $CH_3CHF_2$ | Ind | 323 | 14.0 | 141 | 2.3 | 1.8 |
| 64 | $CH_3CHF_2$ | Ind | 243 | 9.1 | 138 | 2.3 | 1.8 |
| 65 | $CH_3CHF_2$ | Ind | 526 | 8.6 | 146 | 2.3 | 1.9 |
| 66 | $CH_3Cl$ | βP | 402 | 10.5 | 20.7 | 1.0 | 8.3 |
| 67 | $CH_3Cl$ | βP | 406 | 10.6 | 20.5 | 1.1 | 7.8 |
| 68 | $CH_3Cl$ | βP | 235 | 6.2 | 17.6 | 1.0 | 8.9 |
| 69 | $CH_2FCF_3$ | βP | 644 | 17.7 | 29.5 | 1.4 | 9.4 |
| 70 | $CH_2FCF_3$ | βP | 833 | 22.1 | 39.7 | 1.4 | 8.1 |
| 71 | $CH_2FCF_3$ | βP | 610 | 16.2 | 37.0 | 1.4 | 8.5 |

Table 12 lists the results of polymerizations that were conducted at −50° C. either in methyl chloride (as a comparative, examples 72, 73, 74, 81, 82, and 83), 1,1,1,2-tetrafluoroethane or 1,1-difluoroethane. Isobutylene was copolymerized with either p-t-butylstyrene (t-BuS) (0.36 ml per run) or indene (Ind) (0.23 ml per run) as indicated in Table 12. A stock solution of ethylaluminum dichloride (EADC) and hydrogen chloride (HCl) was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. Polymerizations were run by adding, dropwise, 1.5 ml of this stock EADC/HCl solution to the stirred monomer solutions except for examples 72, 73, 74, 81, 82, 83 and 87. In examples 72, 73, 74, 81, 82, 83, and 87, 2.3 ml of EADC/HCl solution was used. Polymerizations were terminated with the addition of 0.2 ml of methanol. Polymerization in any of the hydrofluorocarbons resulted in rubber particles that did not adhere to the walls of the reactor or to the stirring bar. The particles floated to the surface of the liquid when stirring stopped. The particles were much more stiff, as evidenced by pressing on them with a chilled spatula when tested near reaction temperature, than with the methyl chloride prepared examples. Polymerization in methyl chloride resulted in rubber particles that adhered to both the reactor walls and the stirring shaft.

TABLE 12

| Example | Diluent | CoM | Yield (mg) | Conv. (wt. %) | $M_w \times 10^{-3}$ | $M_w/M_n$ | mol % CoM |
|---|---|---|---|---|---|---|---|
| 72 | $CH_3Cl$ | t-BuS | 1750 | 45.3 | 48.4 | 1.7 | 2.9 |
| 73 | $CH_3Cl$ | t-BuS | 1917 | 49.6 | 58.0 | 1.9 | 2.9 |
| 74 | $CH_3Cl$ | t-BuS | 2758 | 71.4 | 60.4 | 2.0 | 2.9 |
| 75 | $CH_2FCF_3$ | t-BuS | 500 | 12.9 | 35.3 | 1.4 | 4.1 |
| 76 | $CH_2FCF_3$ | t-BuS | 523 | 13.5 | 39.2 | 1.5 | 4.3 |
| 77 | $CH_2FCF_3$ | t-BuS | 568 | 14.7 | 39.7 | 1.5 | 4.3 |
| 78 | $CH_3CHF_2$ | t-BuS | 651 | 16.9 | 68.1 | 1.7 | 4.4 |
| 79 | $CH_3CHF_2$ | t-BuS | 733 | 19.0 | 71.9 | 1.6 | 4.1 |
| 80 | $CH_3CHF_2$ | t-BuS | 440 | 11.4 | 70.3 | 1.7 | 2.8 |
| 81 | $CH_3Cl$ | Ind | 704 | 18.6 | 49.9 | 1.4 | 1.0 |
| 82 | $CH_3Cl$ | Ind | 645 | 17.1 | 34.1 | 1.4 | 1.4 |
| 83 | $CH_3Cl$ | Ind | 319 | 8.4 | 44.6 | 1.4 | 1.1 |
| 84 | $CH_2FCF_3$ | Ind | 424 | 11.3 | 36.7 | 1.4 | 1.7 |
| 85 | $CH_2FCF_3$ | Ind | 464 | 12.4 | 37.9 | 1.4 | 2.0 |
| 86 | $CH_2FCF_3$ | Ind | 496 | 13.2 | 40.8 | 1.5 | 1.9 |
| 87 | $CH_3CHF_2$ | Ind | 328 | 8.7 | 40.8 | 1.5 | 1.4 |
| 88 | $CH_3CHF_2$ | Ind | 338 | 9.0 | 42.9 | 1.5 | 1.3 |

Table 13 lists the results of polymerizations that were conducted at −95° C. in a 20 wt. % blend of 1,1-difluoroethane in 1,1,1,2-tetrafluoroethane. Isobutylene was copolymerized with one of the following comonomers or comonomer pairs as indicated in Table 13: isoprene (IP) (0.20 ml per run), p-methylstyrene (pMS) (0.26 ml per run), p-t-butylstyrene (t-BuS) (0.36 ml per run), indene (Ind) (0.23 ml per run), β-pinene (βP) (0.31 ml per run) or a 50/50 mol/mol blend (IP/pMS) of isoprene (0.10 ml) and p-methylstyrene (0.13 ml) per run as indicated in Table 20. A stock solution of ethylaluminum dichloride (EADC) and hydrogen chloride (HCl) was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. Polymerizations were run by adding, dropwise, 1.5 ml of this stock EADC/HCl solution to the stirred monomer solutions, except for examples 98, 99, 100, 101, 102, and 103. For examples 98, 99 and 100, 3.0 ml of EADC/HCl solution was used. For examples 101, 102 and 103, 2.3 ml of EADC/HCl solution was used. Polymerizations were terminated with the addition of 0.2 ml of methanol. Polymerization in any of the hydrofluorocarbons resulted in rubber particles that did not adhere to the walls of the reactor or to the stirring bar. The particles floated to the surface of the liquid when stirring stopped. The particles were hard as evidenced by pressing on them with a chilled spatula when tested near reaction temperature. Polymerization in methyl chloride resulted in rubber particles that adhered to both the reactor walls and the stirring shaft.

TABLE 13

| Example | CoM | Yield (mg) | Conv. (wt. %) | $M_w \times 10^{-3}$ | $M_w/M_n$ | mol % CoM |
|---|---|---|---|---|---|---|
| 89 | IP | 1147 | 31.1 | 453 | 2.0 | 1.9 |
| 90 | IP | 2061 | 55.9 | 628 | 1.8 | 2.0 |
| 91 | IP | 2382 | 64.6 | 276 | 2.0 | 2.2 |
| 92 | pMS | 654 | 17.3 | 782 | 3.4 | 2.8 |
| 93 | pMS | 722 | 19.1 | 624 | 3.0 | 2.8 |
| 94 | pMS | 795 | 21.0 | 665 | 3.0 | 2.7 |
| 95 | t-BuS | 411 | 10.6 | 304 | 2.0 | 1.6 |
| 96 | t-BuS | 389 | 9.8 | 252 | 2.1 | 1.9 |
| 97 | t-BuS | 445 | 11.5 | 241 | 2.1 | 1.9 |
| 98 | Ind | 166 | 4.4 | 283 | 2.2 | 1.3 |
| 99 | Ind | 405 | 10.7 | 267 | 2.3 | 1.4 |
| 100 | Ind | 208 | 5.5 | 317 | 2.1 | 1.2 |
| 101 | βP | 1340 | 35.6 | 104 | 1.5 | 5.2 |
| 102 | βP | 375 | 10.0 | 79.4 | 1.4 | 8.4 |
| 103 | βP | 389 | 10.4 | 76.9 | 1.4 | 8.8 |
| 104 | IP/pMS | 331 | 8.9 | 632 | 1.8 | 0.49/1.7 |
| 105 | IP/pMS | 423 | 11.3 | 699 | 1.8 | 0.67/1.5 |
| 106 | IP/pMS | 361 | 9.7 | 989 | 2.1 | 0.71/1.5 |

Table 14 lists the results of copolymerization of isobutylene and butadiene (0.15 ml per run) that were conducted at −95° C. in methyl chloride (as a comparative, examples 107 and 108), 1,1,1,2-tetrafluoroethane, 1,1-difluoroethane or a 20 wt. % blend ($CH_3CHF_2/CH_2FCF_3$) of 1,1-difluoroethane in 1,1,1,2-tetrafluoroethane. A stock solution of ethylaluminum dichloride (EADC) and hydrogen chloride (HCl) was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. Polymerizations were run by the adding, dropwise, 1.5 ml of this stock EADC/HCl solution to the stirred monomer solutions. Polymerizations were terminated with the addition of 0.2 ml of methanol. Polymerization in any of the hydrofluorocarbons resulted in rubber particles that did not adhere to the walls of the reactor or to the stirring bar. The particles floated to the surface of the liquid when stirring stopped. The particles were hard as evidenced by pressing on them with a chilled spatula when tested near reaction temperature. Polymerization in methyl chloride resulted in rubber particles that adhered to both the reactor walls and the stirring shaft. The polymers listed in Table 14 exhibited molecular weights that were higher than the exclusion limit of the SEC instrument used to determine the molecular weights. The $M_w$ of these polymers is above 1.5× $10^6$ g/mol. Molecular weight distributions (MWD) could also not be determined for these samples because of the high molecular weight.

TABLE 14

| Example | Diluent | Yield (mg) | Conv. (wt. %) | mol % CoM |
|---|---|---|---|---|
| 107 | $CH_3Cl$ | 503 | 13.7 | 0.2 |
| 108 | $CH_3Cl$ | 689 | 18.8 | 0.1 |
| 109 | $CH_2FCF_3$ | 448 | 12.2 | 0.2 |
| 110 | $CH_2FCF_3$ | 543 | 14.8 | 0.3 |
| 111 | $CH_2FCF_3$ | 404 | 11.0 | 0.3 |
| 112 | $CH_3CHF_2$ | 338 | 9.2 | 0.2 |
| 113 | $CH_3CHF_2$ | 481 | 13.1 | 0.1 |
| 114 | $CH_3CHF_2$ | 352 | 9.6 | 0.2 |
| 115 | $CH_3CHF_2/CH_2FCF_3$ | 453 | 12.4 | 0.3 |
| 116 | $CH_3CHF_2/CH_2FCF_3$ | 777 | 21.2 | 0.2 |
| 117 | $CH_3CHF_2/CH_2FCF_3$ | 573 | 15.7 | 0.2 |

Examples 118-141

The polymerization examples listed in Tables 15 and 16 were obtained by running slurry copolymerizations in test tubes equipped with rare earth magnetic stir bars. Monomer solutions were prepared in the test tubes at −95° C. for examples in Table 15 and −35° C. for examples in Table 16. The solutions were prepared by combining 20 ml of the chilled liquid diluent, 5 ml of liquid isobutylene and 0.20 ml of isoprene. Exceptions to this procedure are noted below. Polymerization solutions were magnetically stirred at temperature and were initiated by the dropwise addition of a stock coinitiator/initiator solution using a chilled glass Pasteur pipette. Conversion is reported as weight percent of the monomers converted to polymer.

Table 15 lists the results of polymerizations that were conducted at −95° C. Examples 118, 119, 120, 123, 124, 125, and 126 are comparative examples with Examples 118 and 119 being examples of this invention.

Polymerizations were run by the dropwise addition of this stock of ethylaluminum dichloride (EADC)/hydrogen chloride (HCl) solution to the stirred monomer solutions. A stock solution of EADC and HCl was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. The total volume of the stock solution added to the polymerization for each example is listed in Table 15. A separate stock solution of ethylaluminum dichloride and hydrogen chloride was used for Examples 125 and 126. This solution was prepared from the addition of 2.0 ml of a 0.16 mol/L HCl solution in 1,1,1,2-tetrafluoroethane and 0.960 ml of a 1.0 mol/L ethylaluminum dichloride solution in hexane to 100 ml of methyl chloride. The final mol/L concentrations of ethylaluminum dichloride and hydrogen chloride in the stock solution is the same for both preparations. Polymerizations were terminated with the addition of 0.2 ml of methanol. Polymerization in 3,3,3-trifluoropropene resulted in rubber particles that did not adhere to the walls of the reactor or to the stirring bar. The particles floated to the surface of the liquid when stirring stopped. The particles were hard as evidenced by pressing on them with a chilled spatula when tested near reaction temperature. Polymerization in methyl chloride resulted in rubber particles that adhered to both the reactor walls and the stirring shaft. Polymerization in 1,1-dichloroethane or 1,1-dichloroethene resulted in solvent swollen polymer particles that adhered to the reactor walls and the stirring bar.

Table 16 lists the results of polymerizations that were conducted at −35° C. Examples 127-136 are comparative examples with Examples 137-141 being examples of this invention.

Polymerizations were run by the dropwise addition of a stock solution of the coinitiator/initiator pair. A stock solution of ethylaluminum dichloride and hydrogen chloride (HCl) was prepared in methyl chloride by adding 0.320 ml of a 1.0 mol/L HCl solution in 1,1,1,2-tetrafluoroethane and 0.960 ml of a 1.0 mol/L ethylaluminum dichloride solution in hexane to 100 ml of methyl chloride. A separate stock solution of ethylaluminum dichloride and hydrogen chloride was used for Examples 134, 135 and 136. This solution was prepared from the addition of 0.034 ml of a 0.93 mol/L HCl solution in 1,1,1,2-tetrafluoroethane and 0.0960 ml of a 1.0 mol/L ethylaluminum dichloride solution in hexane to 10 ml of methyl chloride. The final mol/L concentrations of ethylaluminum dichloride and hydrogen chloride in the stock solution are the same for both preparations. A separate stock solution of methylaluminum dichloride (MADC)/2-chloro-2,4,4-trimethylpentane (TMPCl) was used for Examples 132 and 133. The MADC/TMPCl solution was prepared from the addition of 6.6 microliters of TMPCl and 0.0960 ml of a 1.0 mol/L methylaluminum dichloride solution in hexane to 10 ml of methyl chloride. The total volume of the stock solution added to the polymerization for each example is listed in Table 16.

Polymerizations were terminated with the addition of 0.2 ml of methanol. The polymerization in 1,1-difluoroethane or 1,1,1,2-tetrafluoroethane gave rubber particles that exhibited stiff-rubbery physical properties as evidenced by probing with a chilled spatula at reaction temperature. Minor amounts of fouling were evident on the reactor walls and stirring bar. In comparison, the polymerization in methyl chloride resulted in a viscous coating of polymer on both the reactor walls and the stirring bar. Very little of the polymer was "suspended" in the diluent medium. Polymerization in 1,2-difluorobenzene or 1,2-dichloroethane resulted in solvent swollen polymer phases that adhered to the reactor walls and the stirring bar. Polymerization in 1,1,1-trichloroethane occurred in solution. Polymer was recovered by removing weathering off the solvent.

TABLE 15

| Example | Diluent | Cat. Soln. (ml) | Yield (mg) | Conv. (wt. %) | $M_w \times 10^{-3}$ | $M_w/M_n$ | mol % IP |
|---|---|---|---|---|---|---|---|
| 118 | $CH_3Cl$ | 1.7 | 844 | 22.9 | 271 | 2.2 | 1.7 |
| 119 | $CH_3Cl$ | 1.7 | 618 | 16.7 | 255 | 1.9 | 1.8 |
| 120 | $CH_3Cl$ | 1.7 | 597 | 16.2 | 224 | 2.2 | 1.7 |
| 121 | $H_2C=CHCF_3$ | 1.7 | 309 | 16.7 | 266 | 2.3 | 2.2 |
| 122 | $H_2C=CHCF_3$ | 1.7 | 274 | 20.6 | 218 | 2.1 | 1.8 |
| 123 | $H_2C=CCl_2$ | 1.7 | 118 | 3.2 | 33 | 1.4 | 1.4 |
| 124 | $H_2C=CCl_2$ | 4.0 | 447 | 13.4 | 47 | 2.1 | 1.0 |
| 125 | $CH_3CHCl_2$ | 1.5 | 112 | 3.0 | 108 | 3.1 | 1.7 |
| 126 | $CH_3CHCl_2$ | 1.5 | 202 | 5.5 | 116 | 2.6 | 1.9 |

TABLE 16

| Example | Diluent | Cat. Soln. (ml) | Yield (mg) | Conv. (wt. %) | $M_w \times 10^{-3}$ | $M_w/M_n$ | mol % IP |
|---|---|---|---|---|---|---|---|
| 127 | $CH_3Cl$ | 4.0 | 1953 | 53.1 | 45 | 1.2 | 1.2 |
| 128 | $CH_3Cl$ | 4.0 | 1678 | 45.6 | 54 | 1.3 | 1.3 |
| 129 | $CH_3Cl$ | 4.0 | 2339 | 63.6 | 51 | 1.2 | 1.4 |
| 130 | $CH_3CCl_3$ | 4.0 | 3068 | 83.2 | 48 | 2.2 | 0.9 |
| 131 | $CH_3CCl_3$ | 5.0 | 2993 | 81.2 | 59 | 2.2 | 1.0 |
| 132 | 1,2-difluorobenzene | 4.0 | 2033 | 55.1 | 35 | 1.6 | 1.5 |
| 133 | 1,2-difluorobenzene | 4.0 | 1901 | 51.6 | 29 | 1.8 | 1.4 |
| 134 | $CH_2ClCH_2Cl$ | 4.0 | 2563 | 69.5 | 29 | 1.9 | 1.3 |
| 135 | $CH_2ClCH_2Cl$ | 4.0 | 2707 | 73.4 | 24 | 1.8 | 1.3 |
| 136 | $CH_2ClCH_2Cl$ | 4.0 | 2683 | 72.8 | 27 | 1.9 | 1.4 |
| 137 | $CH_2FCF_3$ | 3.0 | 2348 | 63.8 | 76 | 1.5 | 2.3 |
| 138 | $CH_2FCF_3$ | 1.5 | 1024 | 27.8 | 92 | 1.5 | 2.2 |
| 139 | $CH_3CHF_2$ | 3.0 | 1085 | 29.5 | 78 | 1.5 | 1.6 |
| 140 | $CH_3CHF_2$ | 3.0 | 1104 | 30.0 | 92 | 1.4 | 1.6 |
| 141 | $CH_3CHF_2$ | 3.0 | 953 | 25.9 | 95 | 1.5 | 1.6 |

Examples 142-146

Table 17 lists the results of copolymerizations of isobutylene isoprene that were conducted at −95° C. $CH_2FCF_3$. The isobutylene/isoprene feed ration was changed for each example. A three-neck 500 ml glass reactor was used for these examples. Prior to each polymerization, 300 ml of monomer feed containing 10 wt % of monomers were charged into the chilled reactor. The initiator/coinitiator molar ratio was controlled at 1/3 and the concentration was set at 0.1 wt % EADC in MeCl. The initiator/coinitiator solution was added dropwise to the polymerization mixture and the rate of addition is controlled in such as way so that the reactor temperature raise did not exceed 4° C. The amount of initiator/coinitiator solution added in each depended on the desired monomer conversion target.

TABLE 17

| Example | IB/IP Molar Feed Ratio | Conversion (Wt. %) | $M_n \times 10^{-3}$ | $M_w \times 10^{-3}$ | $M_w/M_n$ | Mol % IP |
|---|---|---|---|---|---|---|
| 142 | 98/2 | 100 | 209 | 905 | 4.3 | 1.2 |
| 143 | 97/3 | 100 | 141 | 636 | 4.5 | 1.7 |
| 144 | 95/5 | 100 | 127 | 481 | 3.8 | 2.9 |
| 145 | 93/7 | 94 | 174 | 423 | 2.4 | 3.8 |
| 146 | 90/10 | 85 | 133 | 348 | 2.6 | 5.2 |

These examples demonstrate the preparation of high molecular weight copolymers with high isoprene incorporation. The agglomeration of the slurry particles is significantly reduced in the hydrofluorocarbon. The GPC traces of these isobutylene/isoprene copolymers do not show any sign of gel formation or cross-linking, even for the Example 146 which contains more than 5 mol % isoprene. The high diene isobutylene/isoprene polymers made according to this invention can be halogenated subsequently via standard, established halogenation processes for making halobutyl polymers.

Example 147

Figure 3:
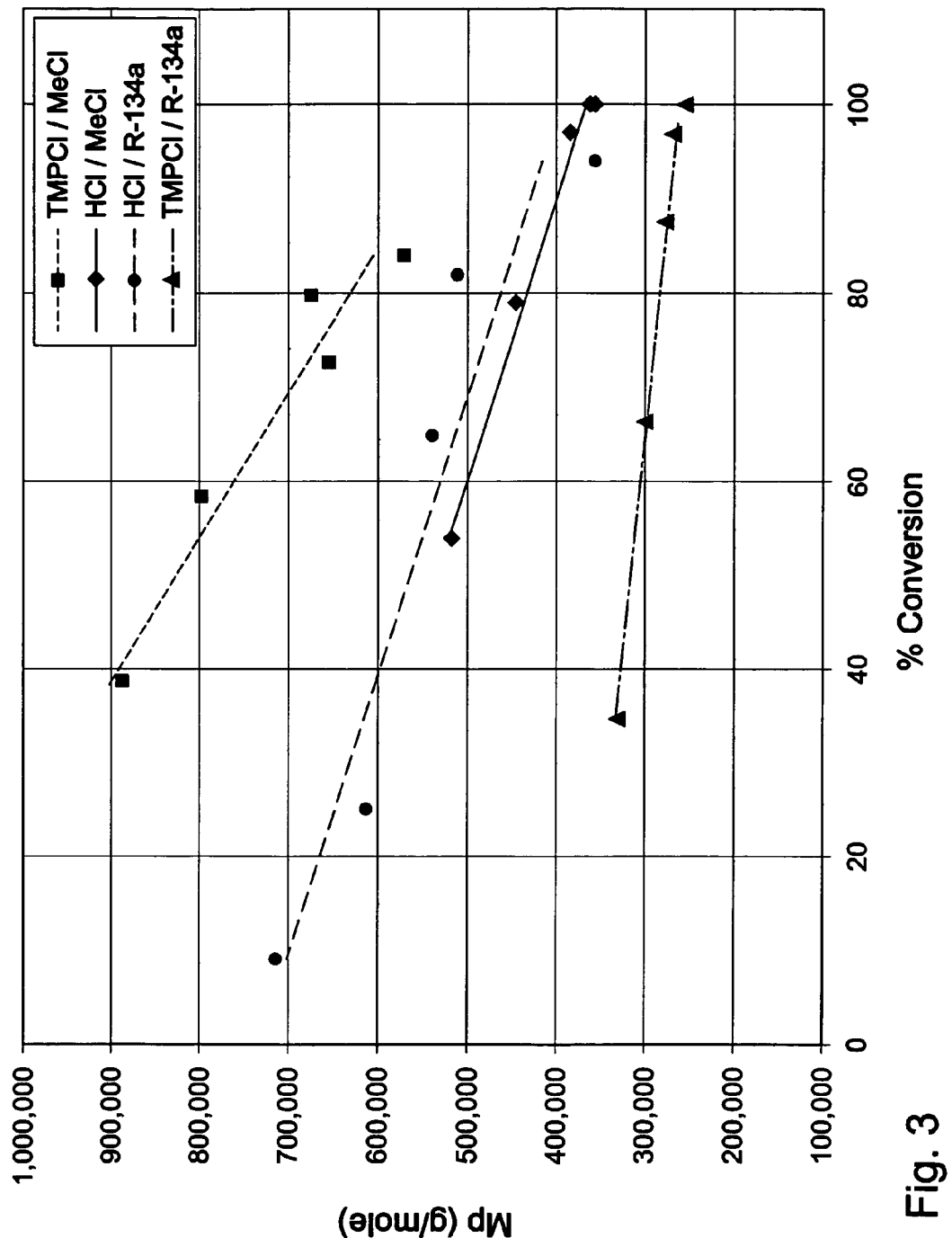
FIG. 3 is a plot of peak molecular weight ($M_p$) versus monomer conversion of certain inventive polymers as described herein.

The dependence of molecular weight on conversion was determined for isobutylene/isoprene copolymerizations run in methyl chloride and $CH_2FCF_3$ at −95° C. This dependence was determined for two different initiator/coinitiator systems; one based on TMPCl and the other based on HCl. Both catalyst systems used EADC as the Lewis acid coinitiator. A three-neck 500 ml glass reactor was used for these examples. Prior to each polymerization, 300 ml of monomer feed containing 10 wt % of the monomers were charged into the chilled reactor. A molar ratio of 95/5 isobutylene/isoprene was used for each polymerization. The initiator/coinitiator molar ratio was controlled at 1/3 and the concentration was set at 0.1 wt % EADC in MeCl. The initiator/coinitiator solution was added dropwise to the polymerization mixture and the rate of addition is controlled in such as way so that the reactor temperature raise did not exceed 4° C. The amount of initiator/coinitiator solution added in each depended on the desired monomer conversion target. The data for these polymerizations are shown in FIG. 3 as a plot of peak molecular weight (Mp) versus the monomer conversion in wt %. The expected decline of molecular weight with increasing conversion is observed. These data also show that HCl is a preferred initiator for copolymerizations in $CH_2FCF_3$.

Example 148

A copolymerization of isobutylene and cyclopentadiene was conducted at −93° C. in $CH_2FCF_3$. A molar ratio of 97/3 of isobutylene/cyclopentadiene was used for this polymerization at 10.8 wt % monomers in the feed. Cyclopentadiene was freshly cracked for this experiment. The initiator/coinitiator solution was prepared by dissolving 200 microliters of a 1.0 mol/L solution of hydrogen chloride in $CH_2FCF_3$ into 50 ml of pre-chilled $CH_2FCF_3$. To this solution was added 500 microliters of a 1.0 mol/L solution of ethylaluminum dichloride in hexane. This solution was stirred for 5 minutes. Polymerization was begun by the dropwise addition of the initiator/coinitiator solution into the monomer solution with stirring. The addition of this solution was maintained at a rate necessary to keep the polymerization temperature from rising above −92° C. A total of 35 ml of the initiator/coinitiator solution was used. A 500 ml glass resin kettle was used for this example.

TABLE 18

| Example | Diluent | Conversion (Wt %) | $M_w \times 10^{-3}$ | $M_w/M_n$ | Mol % CPD | % 1, 2 |
|---|---|---|---|---|---|---|
| 148 | $CH_2FCF_3$ | 50 | 527 | 1.9 | 5.3 | 15 |

The solubility tests reported in Tables 19-25 were performed using neat ethylaluminum dichloride (EADC). Each test was performed in the following way. 5 ml of the condensed hydroflurocarbon were charged into a dried test tube cooled to −90 °C. in the box cold bath. To this liquid at −90 °C., 4.1 microliters of neat, liquid ethylaluminum dichloride (EADC) was added. Solubility was checked by vigorously agitating the resulting mixture. The mixture was cooled to −90 °C. by immersing the test tube into cold bath. Reported observations were made after the completed heating/cooling cycle. If after this first heat/cool cycle, the catalyst did not dissolve, 0.5 ml of methyl chloride was added. The heat/cool cycle was repeated. Subsequent additions of 0.5 ml of methyl chloride were made following each heat/cool cycle until the EADC was observed to dissolve or a 50/50 V/V blend was achieved. The following observations were made and recorded.

1,1,1,2-Tetraflouroethane (HFC-134a)

TABLE 19

| Preparation | Volume % Methyl Chloride | Observation |
| --- | --- | --- |
| EADC + 5 ml HFC-134a | 0 | Insoluble 'chips' |
| +0.5 ml methyl chloride | 9 | Fine-scale flocculation |
| +0.5 ml methyl chloride | 17 | Fine-scale flocculation |
| +0.5 ml methyl chloride | 23 | Cloudy suspension; slight floc at b.p. |
| +0.5 ml methyl chloride | 29 | Cloudy; very small particles |
| +0.5 ml methyl chloride | 33 | Less cloudy; no visible particles |
| +0.5 ml methyl chloride | 38 | Still less cloudy |
| +0.5 ml methyl chloride | 41 | Nearly clear |
| +0.5 ml methyl chloride | 44 | Nearly clear |
| +0.5 ml methyl chloride | 47 | Clear |
| +0.5 ml methyl chloride | 50 | Clear |

In the tests in Table 19, the flocculation occurred after cessation of stirring, from a very cloudy suspension. The original 'chips' were no longer visible.

Diflouromethane (HFC-32)

TABLE 20

| Preparation | Volume % Methyl Chloride | Observation |
| --- | --- | --- |
| EADC + 5 ml HFC-32 | 0 | Insoluble 'chips' |
| +0.5 ml methyl chloride | 9 | Slight cloudy |
| +0.5 ml methyl chloride | 17 | Some flocculation |
| +0.5 ml methyl chloride | 23 | Clear |

Flouroform (HFC-23)

TABLE 21

| Preparation | Volume % Methyl Chloride | Observation |
| --- | --- | --- |
| EADC + 5 ml HFC-23 | 0 | Insoluble 'chips' |
| +0.5 ml methyl chloride | 9 | Insoluble |
| +0.5 ml methyl chloride | 17 | Insoluble |
| +0.5 ml methyl chloride | 23 | Insoluble |
| +0.5 ml methyl chloride | 29 | Insoluble |
| +0.5 ml methyl chloride | 33 | Insoluble |
| +0.5 ml methyl chloride | 38 | Insoluble |
| +0.5 ml methyl chloride | 41 | Insoluble |
| +0.5 ml methyl chloride | 44 | Insoluble |
| +0.5 ml methyl chloride | 47 | Insoluble |
| +0.5 ml methyl chloride | 50 | Insoluble |

1,1,1-Triflouroethane (HFC-143a)

TABLE 22

| Preparation | Volume % Methyl Chloride | Observation |
| --- | --- | --- |
| EADC + 5 ml HFC-143a | 0 | Insoluble 'chips' |
| +0.5 ml methyl chloride | 9 | Cloudy suspension |
| +0.5 ml methyl chloride | 17 | Cloudy suspension |
| +0.5 ml methyl chloride | 23 | Clear solution |

1,1-difluroethane (HFC-152a)

TABLE 23

| Preparation | Volume % Methyl Chloride | Observation |
| --- | --- | --- |
| EADC + 5 ml HFC-152a | 0 | Soluble |

The solubility tests performed in Table 24 were performed using 1.0 mol/L stock hydrocarbon solutions of ethylaluminum dichloride (EADC) prepared at room temperature from neat EADC and the hydrocarbon listed in the table. Pentane refers to normal pentane. ULB hexanes refers to an ultra low benzene grade of hexanes, an isometric mixture, which contains less than 5 ppm benzene. The final 1,1,1,2 —tetrafluoroethane (HFC—134a) solution was prepared by adding the room temperature EADC stock solution, volume listed in the table, to the liquid HFC—134a in a test tube held at −35 °C. In all cases, an initial solution is obtained which is clear and colorless. The resulting solution was then cooled by immersing the test tube into the dry box cold bath thermostated at −95 °C. The cloud point was determined by monitoring the temperature of the liquid with a thermometer and visually determined the onset of cloudiness. The solutions again became clear by allowing the solutions to warm to a temperature above the cloud point. The behavior of the solution around the cloud point was observed for several minutes by repeatedly cooling and warming the solution. This phenomenon was found to be reproducible.

TABLE 24

| Hydrocarbon | Volume (microliters) of 1.0 M Stock EADC Solution | Volume of HFC-134a (mL) | Final EADC Concentration (Wt. %) | Cloud Point (° C.) |
|---|---|---|---|---|
| Pentane | 100 | 10 | 0.1 | −87 |
| Pentane | 174 | 15 | 0.1 | −87 |
| ULB hexanes | 174 | 15 | 0.1 | −85 |

Solubility of Alkoxyaluminum Dichlorides in 1,1,1,2-tetraflouroethane (HFC-134a)

The solubility tests reported in Table 25 were conducted by preparing each alkoxyaluminum dichloride in situ. A general procedure follows. A solution of the corresponding alcohol was prepared by adding 0.0001 moles of the alcohol to 10 millimeters of HFC—134a at −30 °C. To this solution was added 100 microliters of a 1.0 mol/L stock pentane solution of EADC. After this last addition, the HFC—134a solution was shaken periodically over the next five minutes. The solution was allowed to warm to −10° C. a closed vessel and then cooled in the dry box cold bath thermostated at −95 ° C. The cloud point was determined by monitoring the temperature of the liquid with a thermometer and visually determining the onset of cloudiness. The solutions again became clear by allowing the solutions to warm to a temperature above the cloud point. The behavior of the solution around the cloud point was observed for several minutes by repeatedly cooling and warming the solution. This phenomenon was found to be reproducible.

TABLE 25

|  | $CH_3OAlCl_2$ | $CH_3CH_2OAlCl_2$ | $(CH_3)_3COAlCl_2$ | $CF_3CH_2OAlCl_2$ |
|---|---|---|---|---|
| FW (g/mol) | 128.92 | 142.95 | 171.00 | 196.92 |
| Wt. % solution @ −40° C. | 0.09 | 0.10 | 0.12 | 0.14 |
| Cloud point (° C.) | −85 | −85 | −85 w/solids | −87 |

Examples 149-151

Figure 4:
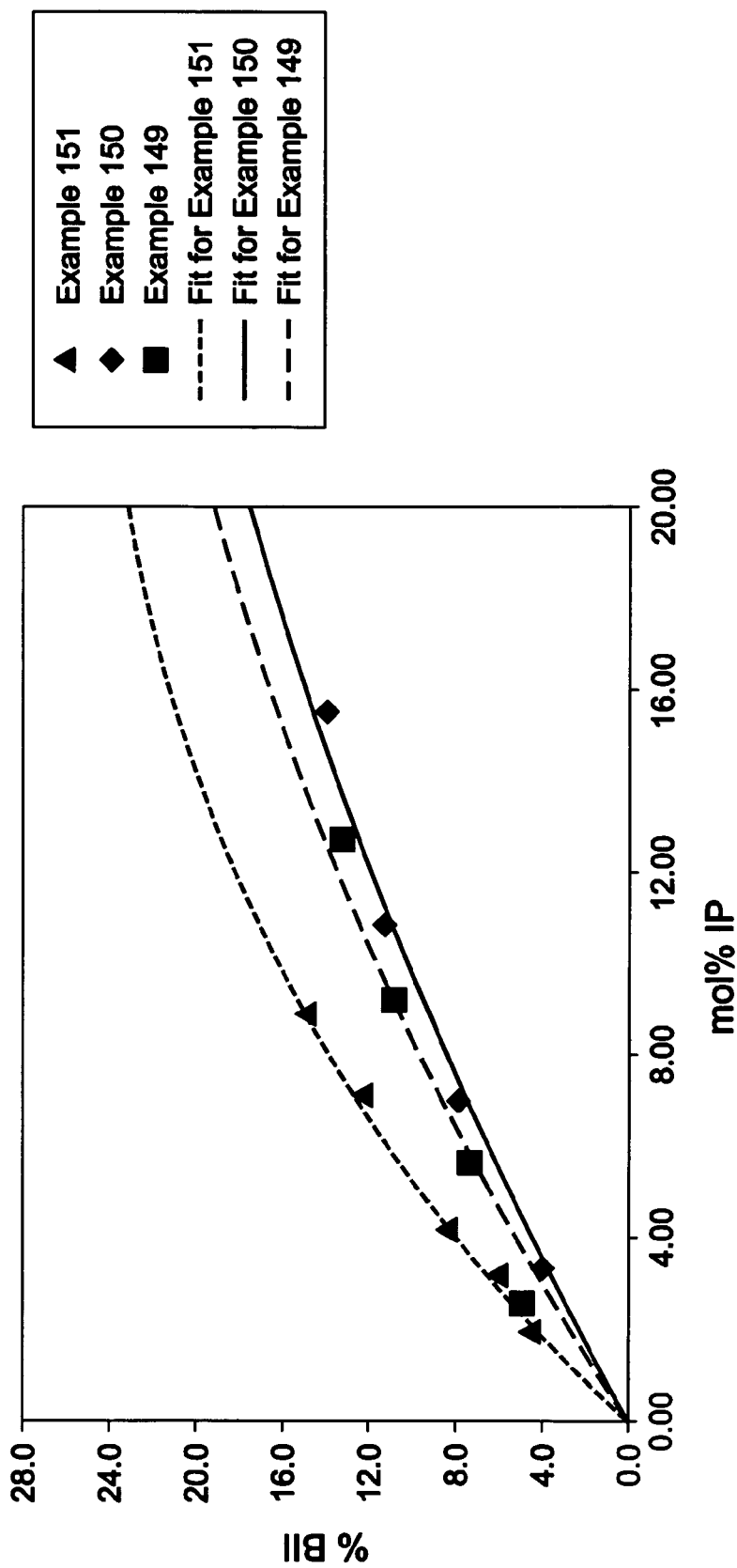
FIG. 4 is a graph of the relationship between the percentage of the BII triad fraction and the mol % IP incorporated into the copolymer.

Copolymerizations of isobutylene and isoprene was conducted at −95 ° C. using different isobutylene/isoprene comonomer ratios. All copolymerizations were run with 30 ml of diluent and 4.0 ml of isobutylene. Six copolymerizations, varying in the amount of isoprene, were run in three different diluents. The amounts of isoprene added to the monomer solutions to create six different isoprene concentrations for each diluent were 0.11, 0.27, 0.41, 0.57, 0.89, and 1.27 ml. Copolymers for Example 149 were prepared in methyl chloride Example 149 is a comparative example. Copolymers for Example 150 were prepared in 1,1,1,2—retrafluoroethane. Copolymers for Example 151 were prepared in 1,1—difluoromethane. Examples 150, 151 and 152 was prepared in 1,1—difluoromethane. Examples 150, 151 and 152 are Examples of the instant invention. Copolymers were prepared using initiator/coinitiator solutions prepared in a 8 ml of the respective diluent by adding 12.6 microliters of a 0.93 mol/L hydrogen chloride solution in $CH_2FCF_3$ and 35.4 microliters of a 1.0 mol/L ethylaluminum dichloride solution in hexane. Polymerizations were conducted by stirring the monomer solutions at 800 rpm and adding the initiator/coinitiator solution dropwise to maintain the temperature below −92 ° C. Copolymers were isolated by quenching the polymerization with methanol, collecting the polymer, and drying the polymer at room temperature in vacuum. The polymers were stored in a freezer until analyses were performed. The BII fraction data (expressed as a percentage) for Examples 149, 150, and 151 is shown in Figure 4 . The comparison of the sequence distribution parameter, m, calculated for these examples by an iterative fit of the copolymer sequence distribution equation shown above is given in Table 26 along with the value of the dielectric constant of the diluent at −95° C.

TABLE 26

| Example | Diluent | Yield wt. % | Mol % IP | % BII | m | $\epsilon$ at −95° C. |
|---|---|---|---|---|---|---|
| 149 | $CH_3Cl$ | 58.9 | 2.55 | 4.99 | 1.4 | 18.34 |
|  |  | 58.4 | 5.61 | 7.41 |  |  |
|  |  | 46.9 | 9.16 | 10.9 |  |  |
|  |  | 45.1 | 12.7 | 13.3 |  |  |
| 150 | $CH_2FCF_3$ | 38.3 | 3.32 | 4.01 | 1.2 | 23.25 |
|  |  | 34.1 | 6.98 | 7.88 |  |  |
|  |  | 37.8 | 10.83 | 11.3 |  |  |
|  |  | 13.1 | 15.5 | 14.0 |  |  |
| 151 | $CH_3CHF_2$ | 48.1 | 1.92 | 4.67 | 2.3 | 29.33 |
|  |  | 42.1 | 3.16 | 6.18 |  |  |
|  |  | 37.2 | 4.16 | 8.46 |  |  |
|  |  | 24.5 | 7.09 | 12.4 |  |  |
|  |  | 15.6 | 8.88 | 14.9 |  |  |
| 152 | $CH_2F_2$ | 100 | 2.4 | 4.3 | 1.9 | 36.29 |

All patents and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features which would be treated as equivalents thereof by those skilled in the art to which the invention pertains.

What is claimed is:

1. A halogenated copolymer comprising an isoolefin and a multiolefin, the halogenated copolymer having a copolymer sequence distribution defined by the following equation:

$$F=mA/(1=mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 2.5; and wherein m is determined by solving said equation.

2. The halogenated copolymer of claim 1, wherein m is from greater than 3.5.

3. The halogenated copolymer of claim 1, wherein the multiolefin is a conjugated diene.

4. The halogenated copolymer of claim 1, wherein the multiolefin content is from greater than 0.5 mol%.

5. The halogenated copolymer of claim 1, wherein the multiolefin content is from greater than 1.0 mol%.

6. The halogenated copolymer of claim 1, wherein the multiolefin content is from greater than 2.5 mol%.

7. The halogenated copolymer of claim 1, wherein the multiolefin content is from greater than 5.0 mol%.

8. A halogenated copolymer comprising isobutylene and isoprene, the halogenated copolymer having a copolymer sequence distribution defined by the following equation:

$$F=mA/(1=mA)^2$$

wherein m is the copolymer sequence distribution parameter; A is the molar ratio of isoprene to isobutylene in the copolymer; and F is the isobutylene-isoprene-isoprene triad fraction in the copolymer; wherein m is from greater than 2.5; and wherein m is determined by solving said equation.

9. The halogenated copolymer of claim 8, wherein m is from greater than 3.5.

10. The halogenated copolymer of claim 8, wherein the isoprene content is from greater than 0.5 mol%.

11. The halogenated copolymer of claim 8, wherein the isoprene content is from greater than 1.0 mol%.

12. The halogenated copolymer of claim 8, wherein the isoprene content is from greater than 2.5 mol%

13. The halogenated copolymer of claim 8, wherein the isoprene content is from greater than 5.0 mol%

14. A halogenated copolymer comprising an isoolefin and a multiolefin, the halogenated copolymer having a copolymer sequence distribution defined by the following equation:

$$F =m A / (1=mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from 1.10 to 1.25; and wherein m is determined by solving said equation.

15. The halogenated copolymer of claim 14, wherein m is from 1.15 to 1.20.

16. The halogenated copolymer of claim 14, wherein m is from 1.15 to 1.25.

17. The halogenated copolymer of claim 14, wherein m is about 1.20.

18. The halogenated copolymer of claim 14, wherein the multiolefin is a conjugated diene.

19. The halogenated copolymer of claim 14, wherein the multiolefin content is from greater than 0.5 mol%.

20. The halogenated copolymer of claim 14, wherein the multiolefin content is from greater than 1.0 mol%.

21. The halogenated copolymer of claim 14, wherein the multiolefin content is from greater than 2.5 mol%.

22. The halogenated copolymer of claim 14, wherein the multiolefin content is from greater than 5.0 mol%.

23. A halogenated copolymer comprising isobutylene and isoprene, the halogenated copolymer having a copolymer sequence distribution defined by the following equation:

$$F =m A / (1=mA)^2$$

wherein m is the copolymer sequence distribution parameter; A is the molar ratio of isoprene to isobutylene in the copolymer; and F is the isobutylene-isoprene-isoprene triad fraction in the copolymer; wherein m is from 1.10 to 1.25; and wherein m is determined by solving said equation.

24. The halogenated copolymer of claim 23, wherein m is from 1.15 to 1.20.

25. The halogenated copolymer of claim 23, wherein m is from 1.15 to 1.25.

26. The halogenated copolymer of claim 23, wherein m is about 1.20.

27. The halogenated copolymer of claim 23, wherein the isoprene content is from greater than 0.5 mol%.

28. The halogenated copolymer of claim 23, wherein the isoprene content is from greater than 1.0 mol%.

29. The halogenated copolymer of claim 23, wherein the isoprene content is from greater than 2.5 mol%.

30. The halogenated copolymer of claim 23, wherein the isoprene content is from greater than 5.0 mol%.

31. A halogenated copolymer produced by the process comprising contacting an isoolefin and a multiolefin, one or more Lewis acid(s), one or more initiator(s), and a diluent comprising one or more hydrofluorocarbon(s) (HFC's); the halogenated copolymer having a copolymer sequence distribution defined by the following equation:

$$F =m A / (1=mA)^2$$

wherein m is the copolymer sequence distribution parameter; A is the molar ratio of multiolefin to isoolefin in the copolymer; and F is the isoolefin-multiolefin-multiolefin triad fraction in the copolymer; wherein m is from greater than 2.5 or m is from 1.10 to 1.25; and wherein m is determined by solving said equation.

32. The halogenated copolymer of claim 31, wherein m is from greater than 3.5.

33. The halogenated copolymer of claim 31, wherein m is from 1.15 to 1.20.

34. The halogenated copolymer of claim 31, wherein m is from 1.15 to 1.25.

35. The halogenated copolymer of claim 31, wherein m is about 1.20.

36. The halogenated copolymer of claim 31, wherein the multiolefin is isoprene and the isoolefin is isobutylene.

37. The halogenated copolymer of claim 31, wherein the multiolefin content is from greater than 0.5 mol%.

38. The halogenated copolymer of claim 31, wherein the multiolefin content is from greater than 1.0 mol%.

39. The halogenated copolymer of claim 31, wherein the multiolefin content is from greater than 2.5 mol%.

40. The halogenated copolymer of claim 31, wherein the multiolefin content is from greater than 5.0 mol%.

41. The halogenated copolymer of claim 31, wherein one or more hydrofluorocarbon(s) is represented by the formula: $C_xH_yF_z$ wherein x is an integer from 1 to 40 and y and z are integers of one or more.

42. The halogenated copolymer of claim 41, wherein x is from 1 to 10.

43. The halogenated copolymer of claim 41, wherein x is from 1 to 6.

44. The halogenated copolymer of claim 41, wherein x is from 1 to 3.

45. The halogenated copolymer of claim 31, wherein the one or more hydrofluorocarbon(s) is independently selected from the group consisting of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3;-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene;1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butane; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene;1,1,2,3,4,4-hexafluoro-2-butene; 1,1,1,2,3,4,4-heptafluoro-2-butene; 1,1,1,2,4,4,4-heptafluoro-2-butene; and mixtures thereof.

46. The halogenated copolymer of claim 31, wherein the one or more hydrofluorocarbon(s) is independently selected from the group consisting of fluoromethane, difluoromethane, trifluoromethane, 1,1-difluoroethane, 1,1,1-trifluoroethane, 1,1,1,2-tetrafluoroethane, and mixtures thereof.

47. The halogenated copolymer of claim 31, wherein the diluent comprises from 15 to 100 volume % HFC based upon the total volume of the diluent.

48. The halogenated copolymer of claim 31, wherein the diluent comprises from 20 to 100 volume % HFC based upon the total volume of the diluent.

49. The halogenated copolymer of claim 31, wherein the diluent comprises from 25 to 100 volume % HFC based upon the total volume of the diluent.

50. The halogenated copolymer of claim 31, wherein the diluent further comprises a hydrocarbon, a non-reactive olefin, and/or an inert gas.

51. The halogenated copolymer of claim 31, wherein the diluent further comprises a halogenated hydrocarbon other than an HFC.

52. The halogenated copolymer of claim 51, wherein the halogenated hydrocarbon is methyl chloride.

53. The halogenated copolymer of claim 31, wherein the one or more Lewis acid(s) is represented by the formula $MX_4$;
wherein M is a Group 4,5, or 14 metal; and
each X is a halogen.

54. The halogenated copolymer of claim 31, wherein the one or more Lewis acid(s) is represented by the formula $MR_nX_{4-n}$;
wherein M is Group 4,5, or 14 metal;
each R is a monovalent $C_1$ to $C_{12}$ hydrocarbon radical independently selected from the group consisting of an alkyl, aryl, arylalkyl, alkylaryl and cycloalkyl radicals;
n is an integer from 0 to 4; and
each X is a halogen.

55. The halogenated copolymer of claim 31, wherein the one or more Lewis acid(s) is represented by the formula $M(RO)_nR'_mX_{4-(m+n)}$;
wherein M is Group 4,5, or 14 metal;
each RO is a monovalent $C_1$ to $C_{30}$ hydrocarboxy radical independently selected from the group consisting of an alkoxy, aryloxy, arylalkoxy, alkylaryloxy radicals;
each R' is a monovalent $C_1$ to $C_{12}$ hydrocarbon radical independently selected from the group consisting of an alkyl, aryl, arylalkyl, alkylaryl and cycloalkyl radicals;
n is an integer from 0 to 4;
m is an integer from 0 to 4, wherein the sum of n and m is not more than 4; and
each X is a halogen.

56. The halogenated copolymer of claim 31, wherein the one or more Lewis acid(s) is represented by the formula $M(RC=OO)_nR'_mX_{4-(m+n)}$;
wherein M is Group 4,5, or 14 metal; each RC=OO is a monovalent $C_2$ to $C_{30}$ hydrocarbacyl radical independently selected from the group consisting of an alkacyloxy, arylacyloxy, arylalkylacyloxy, alkylarylacyloxy radicals;
each R' is a monovalent $C_1$ to $C_{12}$ hydrocarbon radical independently selected from the group consisting of an alkyl, aryl, arylalkyl, alkylaryl and cycloalkyl radicals;
n is an integer from 0 to 4;
m is an integer from 0 to 4, wherein the sum of n and m is not more than 4; and
each X is a halogen.

57. The halogenated copolymer of claim 31, wherein the one or more Lewis acid(s) is represented by the formula $MOX_3$;
wherein M is a Group 5 metal; and
each X is a halogen.

58. The halogenated copolymer of claim 31, wherein the one or more Lewis acid(s) is represented by the formula $MX_3$;
wherein M is a Group 13 metal; and
each X is a halogen.

59. The halogenated copolymer of claim 31, wherein the one or more Lewis acid(s) is represented by the formula $MR_nX_{3-n}$;
wherein M is a Group 13 metal;
each R is a monovalent $C_1$ to $C_{12}$ hydrocarbon radical independently selected from the group consisting of an alkyl, aryl, arylalkyl, alkylaryl and cycloalkyl radicals;
n is an integer from 1 to 3; and
each X is a halogen.

60. The halogenated copolymer of claim 31, wherein the one or more Lewis acid(s) is represented by the formula $M(RO)_nR'_mX_{3-(m+n)}$;
wherein M is a Group 13 metal;
each RO is a monovalent $C_1$ to $C_{30}$ hydrocarboxy radical independently selected from the group consisting of an alkoxy, aryloxy, arylalkoxy, alkylaryloxy radicals; each R' is a monovalent $C_1$ to $C_{12}$ hydrocarbon radical independently selected from the group consisting of an alkyl, aryl, arylalkyl, alkylaryl and cycloalkyl radicals;
n is an integer from 0 to 3;
m is an integer from 0 to 3, wherein the sum of n and m is from 1 to 3; and
each X is a halogen.

61. The halogenated copolymer of claim 31, wherein the one or more Lewis acid(s) is represented by the formula $M(RC=OO)_nR'_mX_{3-(m+n)}$;
wherein M is a Group 13 metal;
each RC=OO is a monovalent hydrocarbacyl radical independently selected from the $C_2$ to $C_{30}$ group consisting of an alkacyloxy, arylacyloxy, arylalkylacyloxy, alkylarylacyloxy radicals;
each R' is a monovalent $C_1$ to $C_{12}$ hydrocarbon radical independently selected from the group consisting of an alkyl, aryl, arylalkyl, alkylaryl and cycloalkyl radicals;
n is an integer from 0 to 3;
m is a integer from 0 to 3, wherein the sum of n and m is from 1 to 3; and
each X is a halogen.

62. The halogenated copolymer of claim 31, wherein the one or more Lewis acid(s) is represented by the formula $MX_y$;
wherein M is a Group 15 metal;
each X is a halogen; and
y is 3,4 or 5.

63. The halogenated copolymer of claim 31, wherein the one or more Lewis acid(s) is represented by the formula $MR_nX_{y-n}$;
wherein M is a Group 15 metal;
each R is a monovalent $C_1$ to $C_{12}$ hydrocarbon radical independently selected from the group consisting of an alkyl, aryl, arylalkyl, alkylaryl and cycloalkyl radicals;
n is an integer from 0 to 4;
y is 3,4 or 5, wherein n is less than y; and
each X is a halogen.

64. The halogenated copolymer of claim 31, wherein the one or more Lewis acid(s) is represented by the formula $M(RO)_nR'_mX_{y-(m+n)}$;
wherein M is a Group 15 metal,
each RO is a monovalent $C_1$ to $C_{30}$ hydrocarboxy radical independently selected from the group consisting of an alkoxy, aryloxy, arylalkoxy, alkylaryloxy radicals;

each R'is a monovalent $C_1$ to $C_{12}$ hydrocarbon radical independently selected from the group consisting of an alkyl, aryl, arylalkyl, alkylaryl and cycloalkyl radicals;

n is an integer from 0 to 4;

m is an integer from 0 to 4;

y is 3,4 or 5, wherein the sum of n and m is less than y; and each X is a halogen.

65. The halogenated copolymer of claim 31, wherein the one or more Lewis acid(s) is represented by the formula $M(RC=OO)_n R'_m X_{y-(m+n)}$;

wherein M is a Group 15 metal;

each RC=OO is a monovalent $C_2$ to $C_{30}$ hydrocarbacyloxy radical independently selected from the group consisting of an alkacyloxy, arylacyloxy, arylalkylacyloxy, alkylarylacyloxy radicals;

each R'is a monovalent $C_1$ to $C_{12}$ hydrocarbon radical independently selected from the group consisting of an alkyl, aryl, arylalkyl, alkylaryl and cycloalkyl radicals;

n is an integer from 0 to 4;

m is an integer from 0 to 4;

y is 3,4 or 5, wherein the sum of n and m is less than y; and each X is a halogen.

66. The halogenated copolymer of claim 31, wherein the one or more Lewis acid(s) is independently selected from the group consisting of titanium tetrachloride, titanium tetrabromide, vanadium tetrachloride, tin tetrachloride, zirconium tetrachloride, titanium bromide trichloride, titanium dibromide dichloride, vanadium bromide trichloride, tin chloride trifluoride, benzyltitanium trichloride, dibenzyltitanium dichloride, benzylzirconium trichloride, dibenzylzirconium dibromide, methyltitanium trichloride, dimethyltitanium difluoride, dimethyltin dichloride, phenylvanadium trichloride, methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride, benzyl isopropoxyvanadium dichloride, acetoxytitanium trichloride, benzoylzirconium tribromide, benzoyloxytitanium trifluoride, isopropoyloxytin trichloride, methyl acetoxytitanium dichloride, benzyl benzoyloxyvanadium chloride, vanadium oxytrichloride, aluminum trichloride, boron trifluoride, gallium trichloride, indium trifluoride, ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum, triethylaluminum, methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride, phenoxy methylindium fluoride, acetoxyaluminum dichloride, benzoyloxyaluminum dibromide, benzoyloxygallium difluoride, methyl acetoxyaluminum chloride, isopropoyloxyindium trichloride, antimony hexachloride, antimony hexafluoride, arsenic pentafluoride, antimony chloride pentafluoride, arsenic trifluoride, bismuth trichloride arsenic fluoride tetrachloride, tetraphenylantimony chloride, triphenylantimony dichloride, tetrachloromethoxyantimony, dimethoxytrichloroantimony, dichloromethoxyarsine, chlorodimethoxyarsine, difluoromethoxyarsine, acetatotetrachloroantimony, (benzoato) tetrachloroantimony, and bismuth acetate chloride.

67. The halogenated copolymer of claim 31, wherein the one or more Lewis acid(s) is independently selected from the group consisting of aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, and titanium tetrachloride.

68. The halogenated copolymer of claim 31, wherein the Lewis acid is not a compound represented by formula $MX_3$, where M is a group 13 metal, X is a halogen.

69. The halogenated copolymer of claim 31, wherein the one or more initiator(s) comprise a hydrogen halide, a carboxylic acid, a carboxylic acid halide, a sulfonic acid, an alcohol, a phenol, a polymeric halide, a tertiary alkyl halide, a tertiary aralkyl halide, a tertiary alkyl ester, a tertiary aralkyl ester, a tertiary alkyl ether, a tertiary aralkyl ether, an alkyl halide, an aryl halide, an alkylaryl halide or an arylalkylacid halide.

70. The halogenated copolymer of claim 31,wherein the one or more initiator(s) is independently selected from the group consisting of HCl, $H_2O$, methanol, $(CH_3)_3CCl$, $C_6H_5C(CH_3)_2Cl$, (2-Chloro-2,4,4-trimethylpentane) and 2-chloro-2-methylpropane.

71. The halogenated copolymer of claim 31, wherein the one or more initiator(s) is independently selected from the group consisting of hydrogen chloride, hydrogen bromide, hydrogen iodide, acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, p-fluorobenzoic acid, acetyl chloride, acetyl bromide, cinnamyl chloride, benzoyl chloride, benzoyl bromide, trichloroacetylchloride, trifluoroacetylchloride, p-fluorobenzoylchloride, methanesulfonic acid, trifluoromethanesulfonic acid, trichloromethanesulfonic acid, p-toluenesulfonic acid, methanesulfonyl chloride, methanesulfonyl bromide, trichloromethanesulfonyl chloride, trifluoromethanesulfonyl chloride, p-toluenesulfonyl chloride, methanol, ethanol, propanol, 2-propanol, 2-methylpropan-2-ol, cyclohexanol, benzyl alcohol, phenol, 2- methylphenol, 2,6-dimethylphenol, p-chlorophenol, p-fluorophenol, 2,3,4, 5,6- pentafluorophenol, and 2-hydroxynaphthalene.

72. The halogenated copolymer of claim 31, wherein the one or more initiator(s) is independently selected from the group consisting of 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro- 1-methylethylbenzene; 1 -chloroadamantane; 1-chloroethylbenzene; 1,4-bis(1 -chloro- 1-methylethyl) benzene; 5 -tert-butyl- 1,3 -bis( 1 -chloro- 1 -methylethyl) benzene; 2-acetoxy -2,4,4-trimethylpentane; 2-benzoyloxy-2,4, 4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1 -acetoxy- 1-methylethylbenzene; 1 -aceotxyadamantane; 1 -benzoyloxyethylbenzene; 1,4-bis( 1-acetoxy- 1 -methylethyl) benzene;5-tert-butyl- 1,3-bis( 1 -acetoxy- 1 -methylethyl) benzene; 2-methoxy-2,4,4-trimethylpentane; 2-isopropoxy-2,4,4-trimethylpentane; 2-methoxy-2-methylpropane;2-benzyloxy-2-methylpropane; 2-methoxy-2,4,4,6,6-pentamethylheptane; 2-isopropoxy-2,4,4,6,6-pentamethylheptane;1 -methoxy- 1 -methylethylbenzene; 1-methoxyadamantane;1 -methoxyethylbenzene; 1 ,4-bis( 1 -methoxy- 1 -methylethyl) benzene; 5 -tert-butyl- 1,3 -bis(1 -methoxy- 1 -methylethyl) benzene, and 1,3,5 -tris( 1 -chloro 1 -methylethyl) benzene.

73. The halogenated copolymer of claim 31, wherein the one or more initiator(s) further comprise a weakly-coordinating anion.

74. The halogenated copolymer of claim 31, wherein the one or more initiator(s) comprise greater than 30 ppm water (based upon weight).

75. The halogenated copolymer of claim 31, wherein the contacting further comprises contacting one or more monomer(s) independently selected from the group consisting of olefins, alpha-olefins, disubstituted olefins, isoolefins, conjugated dienes, non-conjugated dienes, styrenics, substituted styrenics, and vinyl ethers.

76. The halogenated copolymer of claim 31, wherein the contacting further comprises contacting one or more monomer(s) independently selected from the group consisting of styrene, para-alkylstyrene, para-methylstyrene, alpha-methyl styrene, divinylbenzene, diisopropenylbenzene, isobutylene, 2-methyl-l-butene, 3-methyl-l-butene, 2-methyl-2-pentene, isoprene, butadiene, 2,3-dimethyl-1,3-butadiene, β-pinene, myrcene, 6,6-dimethyl-fulvene, hexadiene, cyclopentadiene, methyl cyclopentadiene, piperylene, methyl vinyl ether, ethyl vinyl ether, and isobutyl vinyl ether.

77. The halogenated copolymer of claim 1, 8, 14, 23, or 31, wherein the halogenated copolymer is halogenated with chlorine or bromine.

78. The halogenated copolymer of claim 1, 8, 14, 23, or 31, wherein the halogen content is greater than 0.5 wt% to based upon the weight of the halogenated copolymer.

79. The halogenated copolymer of claim 1, 8, 14, 23, or 31, wherein the halogen content is from 0.5 wt% to 3.0 wt% based upon the weight of the halogenated copolymer.

80. The halogenated copolymer of claim 1, 8, 14, 23, or 31, wherein the halogenated copolymer has a Mw of from greater than 50,000.

81. The halogenated copolymer of claim 1, 8, 14, 23, or 31, wherein the halogenated copolymer has a Mw of from greater than 100,000.

82. The halogenated copolymer of claim 1, 8, 14, 23, or 31, wherein the halogenated copolymer has a Mw of from greater than 500,000.

83. The halogenated copolymer of claim 1, 8, 14, 23, or 31, wherein the halogenated copolymer has a MWD of from greater than 2.

84. The halogenated copolymer of claim 1, 8, 14, 23, or 31, wherein the halogenated copolymer has a MWD of from 2 to 6.

85. The halogenated copolymer of claim 1, 8, 14, 23, or 31, wherein the halogenated copolymer has a Mooney viscosity of at least 20 ± 5 (ML 1 +8 at 125° C., ASTM D 1646).

86. The halogenated copolymer of claim 1, 8, 14, 23, or 31, wherein the halogenated copolymer has a Mooney viscosity of from 20 ±5 to 60 ±5 (ML 1 +8 at 125° C., ASTM D 1646).

87. A blend comprising the halogenated copolymer of claim 1, 8, 14, 23, or 31 and a secondary rubber independently selected from the group consisting of at least one of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPR), ethylene-propylene-diene rubber (EPDM), polysulfide, isobutylene/cyclopentadiene copolymer rubber, isobutylene/methyl cyclopentadiene copolymer rubber, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-α-methylstyrene) halogenated poly(isobutylene-co-isoprene-co-α-methylstyrene), and mixtures thereof.

* * * * *

UNITED STATES PATENT AND TRADEMARK OFFICE
CERTIFICATE OF CORRECTION

PATENT NO.          : 7,491,773 B2
APPLICATION NO. : 11/009660
DATED                   : February 17, 2009
INVENTOR(S)         : Timothy Daniel Shaffer and David Yen-Lung Chung It is certified that error appears in the above-identified patent and that said Letters Patent is hereby corrected as shown below:

Claim 1, line 4; claim 8, line 4; claim 14, line 4; claim 23, line 4; and, claim 31, line 7; each occurrence of the equation "F=mA / (1 = mA)$^2$" should read as follows:

--$F = m A / (1 + mA)^2$--.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,491,773 B2 | Page 1 of 1 |
| APPLICATION NO. | : 11/009660 | |
| DATED | : February 17, 2009 | |
| INVENTOR(S) | : Timothy Daniel Shaffer and David Yen-Lung Chung | |

It is certified that error appears in the above-identified patent and that said Letters Patent is hereby corrected as shown below:

Column 59, Claim 1, line 13; Column 59, claim 8, line 37; Column 59, claim 14, line 58; Column 60, claim 23, line 19; and, Column 60, claim 31, line 46; each occurrence of the equation "$F=mA / (1 = mA)^2$" should read as follows:

$$--F = m A / (1 + mA)^2--.$$

This certificate supersedes the Certificate of Correction issued May 26, 2009.

Signed and Sealed this

Sixteenth Day of June, 2009

JOHN DOLL
*Acting Director of the United States Patent and Trademark Office*